US011269659B2

(12) United States Patent
Irani et al.

(10) Patent No.: US 11,269,659 B2
(45) Date of Patent: *Mar. 8, 2022

(54) NETWORK ADDRESS MANAGEMENT SYSTEMS AND METHODS

(71) Applicant: eBay Inc., San Jose, CA (US)

(72) Inventors: Cherag S. Irani, Gilroy, CA (US); Vedhanarayanan Vijayan, Los Altos, CA (US); Sandhya Fernandes, San Jose, CA (US); Pete Dainty, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,646

(22) Filed: May 20, 2020

(65) Prior Publication Data

US 2020/0293339 A1    Sep. 17, 2020

Related U.S. Application Data

(63) Continuation of application No. 15/938,445, filed on Mar. 28, 2018, now Pat. No. 10,705,856.

(51) Int. Cl.
*G06F 9/44* (2018.01)
*G06F 9/445* (2018.01)
(Continued)

(52) U.S. Cl.
CPC ........ *G06F 9/44521* (2013.01); *G06F 16/951* (2019.01); *G06F 16/955* (2019.01); *H04L 61/20* (2013.01); *H04L 61/6018* (2013.01)

(58) Field of Classification Search
CPC .. G06F 9/44521; G06F 16/951; G06F 16/955; H04L 61/20; H04L 61/6018
(Continued)

(56) References Cited

U.S. PATENT DOCUMENTS 6,119,153 A    9/2000  Dujari et al.
6,654,741 B1  11/2003  Cohen et al.
(Continued)

FOREIGN PATENT DOCUMENTS

EP          1643730 A2      4/2006
WO     2019/191177 A1    10/2019

OTHER PUBLICATIONS

Apple Inc., "App Search Programming Guide—Support Universal Links", 2016, retrieved from https://developer.apple.com/library/archive/documentation/General/Conceptual/AppSearch/UniversalLinks.html, 4 pages (Year: 2016).*

(Continued)

*Primary Examiner* — Ted T. Vo
(74) *Attorney, Agent, or Firm* — FIG. 1 Patents

(57) ABSTRACT

Systems and methods provide for a network address management system for generating consistent network addresses to computing resources and for developing applications that are resilient to changes in the network addresses to those resources. In an embodiment, a consumer application executing on a computing system can receive a network address schema for a provider application via a library. The library may include a function for constructing a network address to the provider application. The consumer application can invoke the function to begin building the network address. The computing system/library extract context information at the time the consumer application invokes the build function, augment the context information using a selected application namespace (e.g., network address patterns and rules), and generate the network address using the augmented context information, patterns, and rules.

20 Claims, 14 Drawing Sheets

(51) Int. Cl.
*H04L 61/50* (2022.01)
*G06F 16/951* (2019.01)
*G06F 16/955* (2019.01)
*H04L 101/618* (2022.01)

(58) Field of Classification Search
USPC .................................................. 717/162–167
See application file for complete search history.

(56) References Cited

U.S. PATENT DOCUMENTS

| | | | |
|---|---|---|---|
| 7,058,633 | B1 | 6/2006 | Gnagy et al. |
| 7,299,298 | B2 | 11/2007 | Allen et al. |
| 7,827,166 | B2 | 11/2010 | Garg et al. |
| 9,003,040 | B2 * | 4/2015 | MacCarthaigh .... H04L 61/3025 709/226 |
| 9,348,663 | B1 | 5/2016 | Boodman et al. |
| 9,727,354 | B2 | 8/2017 | Blazek |
| 10,033,595 | B2 * | 7/2018 | Sif ...................... G06F 9/45533 |
| 10,705,856 | B2 | 7/2020 | Irani et al. |
| 2004/0107177 | A1 | 6/2004 | Covill et al. |
| 2005/0160153 | A1 | 7/2005 | Knutson et al. |
| 2006/0070022 | A1 | 3/2006 | Ng et al. |
| 2014/0067866 | A1 | 3/2014 | Chen |
| 2016/0378792 | A1 | 12/2016 | Rashid et al. |
| 2017/0244803 | A1 | 8/2017 | Saxena |
| 2019/0303175 | A1 | 10/2019 | Irani et al. |

OTHER PUBLICATIONS

Non-Final Office Action received for U.S. Appl. No. 15/938,445, dated May 31, 2019, 11 pages.
Notice of Allowance received for U.S. Appl. No. 15/938,445, dated Dec. 12, 2019, 8 pages.
Notice of Allowance received for U.S. Appl. No. 15/938,445, dated Feb. 24, 2020, 6 pages.
Response to Non-Final Office Action filed Sep. 30, 2019, for U.S. Appl. No. 15/938,445, dated May 31, 2019, 20 pages.
McIntyre, "Using JSON Schema", Downloaded from the Web Resource:<http://usingjsonschema.com/>, 2014, 168 pages.
International Search Report received for PCT Patent Application No. PCT/US2019/024203, dated Jun. 27, 2019, 4 pages.
Written Opinion received for PCT Application No. PCT/US2019/024203, dated Jun. 27, 2019, 7 pages.
Wright et al., "JSON Hyper-Schema: A Vocabulary for Hypermedia Annotation of JSON Draft-Wright-Json Schema-Hyperschema-00", Internet-Draft, Internet Engineering Task Force, Oct. 13, 2016, 22 pages.
International Preliminary Report on Patentability received for PCT Application No. PCT/US2019/024203, dated Oct. 8, 2020, 9 pages.

* cited by examiner

| Name | ViewItem 202 | | |
|---|---|---|---|
| Mapped NS | VI 204 | | |
| Default NS | VI 206 | | |
| Context Scope 208 | Token Name 222 | Scope 224 | Description 226 |
| | intentNS | required | Intent namespace |
| | consumerAppName | required | Consumer application identifier/name |
| | id | required | Meant for the item identifier |
| | title | required | Meant for the item title |
| | cmdParams | optional | Map of N:V pairs that will be added as command/query string |
| | protocol | derived | Protocol to be used for the network address |
| | appDomain | derived | Domain of the producer application |
| | producerAppName | assigned | Producer application identifier/name |

| Application Name Spaces 210 | AppNS Name | Name 228 | Pattern 230 | Default 232 | Related Pattern Names 234 |
|---|---|---|---|---|---|
| | VI 212 | defaultVI ↗216 | @{scheme}://@{appDomain}/@{appOpsToken}/@{title}/@{id} | 'true' | |
| | | | Name 236 | Priority 238 | Condition 240 | Action 242 |
| | Selection ↗218 | selection-rule | 1 | id != null && title != null | ctx.put('selectedAppNS', 'VI') ctx.put('selectionCriteriaMet', 'true') |
| | | ... | | | |
| | | Name | Priority | Condition | Action |
| | Post-Execution ↗220 | cmdParms-rule | 1 | 'true' | ctx.put('cmdStringTokens', 'cmdParams') |
| | | ... | | | |

NETWORK ADDRESS MANAGEMENT SYSTEMS AND METHODS

CROSS-REFERENCE TO RELATED APPLICATION

This application is a continuation application of and claims priority to U.S. patent application Ser. No. 15/938,445, entitled "Network Address Management Systems and Methods," filed on Mar. 28, 2018, the disclosure of which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018, eBay Inc. All Rights Reserved.

TECHNICAL FIELD

The subject matter of the present disclosure generally relates to the technical field of network address management, and more particularly to approaches for generating and maintaining consistent network addresses to computing resources and for developing applications that are resilient to changes in network addresses to those resources.

BACKGROUND

The world wide web comprises billions of web sites, trillions of webpages, and exponentially greater sizes of bytes of data, and these numbers increase every day. Users looking to retrieve relevant information from the Internet find themselves in the predicament of looking for a needle in a haystack. Users must depend on a network addressing system that uniquely identifies each publicly available website/webpage or other network resource and search engines to help navigate the morass of the Internet. The already challenging task of locating information relevant to users or resources that users need can become even more difficult when a resource is associated with a number of different network addresses that are each equally valid to use to identify that resource. Changes to the network addresses of resources can add further complexity.

BRIEF DESCRIPTION OF THE DRAWINGS

Various ones of the appended drawings merely illustrate example embodiments of the present disclosure and cannot be considered as limiting its scope.

FIG. 2 illustrates an example of a network address schema for a network address management system in accordance with an embodiment;

DETAILED DESCRIPTION

Figure 1A:
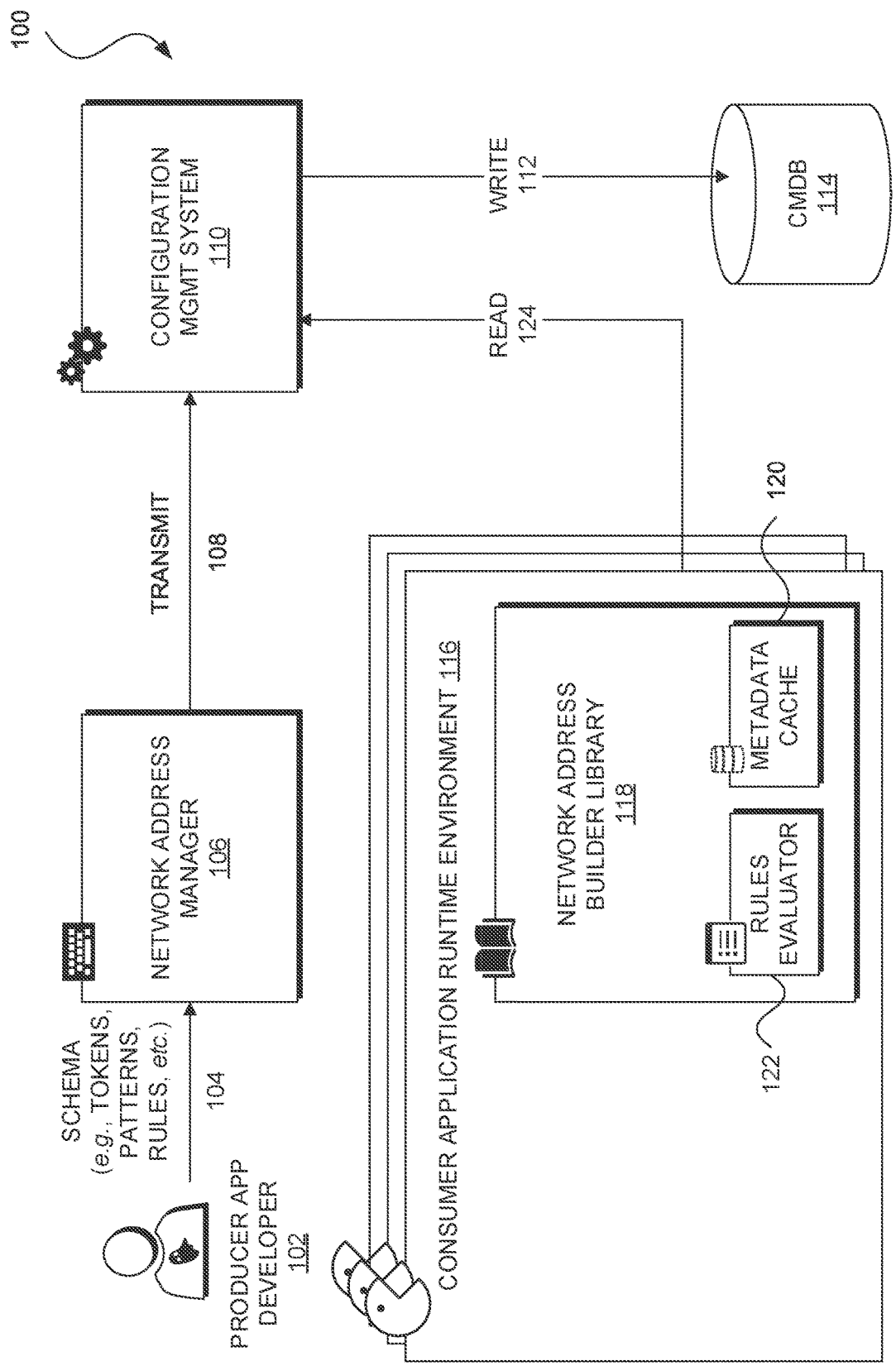
FIG. 1A illustrates an example of a data flow diagram for a network address management system in accordance with an embodiment.

A network address uniquely identifies a node or set of nodes (e.g., computing devices, switches, routers, etc.) in a computing network (e.g., a website or web service). A wide area network (WAN), such as the Internet, typically uses a numeric string, such as a Media Access Control (MAC) or an Internet Protocol (IP) address, or an alphanumeric string that may be easier for users to remember, such as a domain name or uniform resource locator (URL) (e.g., uspto.gov or berkeley.edu), as an identifier for each accessible host or set of hosts of the WAN. Computing devices can interact with one another using network addresses contained in communications that identify the source and destination of the communications. Computing devices can also access subdomains (e.g., eecs.berkeley.edu or alumni.berkeley.edu), subdirectories (e.g., www.uspto.gov/patent or www.uspto.gov/trademark), and other resources (e.g., text, images, audio, videos, multimedia content, applications, etc.) of hosts.

A search engine may launch processes, referred to as bots or spiders, directed toward a host or set of hosts' network address and crawl (e.g., process a webpage or other resource and recursively crawl webpages or other resources linked to the source webpage) to extract certain content (e.g., titles, headings, keyword terms, description metadata, etc.) from the host(s). The search engine can generate indices from the content collected by the web crawl. Some search engines may also index network addresses, and suggest best practices for generating URLs that can optimize search engine processes (e.g., indexing, query processing, presenting search results, etc.) and provide search results that may be more appealing to users. These best practices include using a single URL (or at least as few URLs as possible) for each resource, defining URLs that are short and descriptive (e.g., www.example.com/films/dunkirk.htm versus www.example.com/index.php?pid=1234567890&sessionid=1234567890&user=1234567890), and using punctuation in URLs (e.g., www.example.com/films/the-big-sick.htm versus www.example.com/thebigsick.htm). Best practices can also include avoiding overly complex URLs; dynamically generated webpages or other resources (e.g., small changes to a webpage or resource may cause a search engine to treat the same webpage/resource as separate webpages/resources); broken relative links; and too many parameters and/or problematic, irrelevant, or duplicative parameters (e.g., session identifiers, referral parameters, multiple sorting parameters, etc.).

Some search engines may also determine the linkage or interconnectedness of websites/webpages/resources during indexing, search query processing, or other phases. For example, a search engine can maintain a graph in which websites/webpages/resources represent nodes and hyperlinks represent edges of the graph. The search engine can rank the relevance of websites/webpages/resources relative to search terms based on the respective number of links to each website/webpage/resource associated with the search terms. However, not all linkage is equal. Some search engines may prefer URL links and penalize websites/webpages/resources that utilize Hypertext Transfer Protocol (HTTP) 30x redirects (e.g., giving lower weight to redirects or excluding redirects from linkage computations altogether).

In addition to search engine optimization, it is also sometimes recommended to change network addresses to resources as infrequently as possible (if at all) to provide a more user-friendly experience. For example, users may bookmark websites/webpages/resources or memorize network addresses to regularly accessed resources. Some search engines may cache search results and/or provide search results from indices that have not yet been re-indexed to reflect updated network addresses. Users attempting to navigate to resources whose network addresses have been altered may experience broken links or access unexpected resources.

However, circumstances may arise for deviating from some of the above-mentioned practices. For example, upgrades to a web service or application may require clients to pass a new parameter when attempting to access the upgraded service or application, to access the upgraded service or application at a new network address, to pass parameters to the service or application in a new order, or to otherwise change clients' links to the service or application to the new network address.

As another example, a website operator or web service provider may wish to update network addresses by eliminating subdomains and subdirectories for domain unification and network address simplification (e.g., removing subdomain foo.example.com or www.example.com/foo/ or consolidating foo.example.com and bar.example.com or www.example.com/foo/ and www.example.com/bar/) or for upgrading an application that previously had a device-specific implementation to a more universal implementation (e.g., eliminating mobile.example.com/foo/ or www.example.com/foo_mobile/ because of the redesign of the foo application to be more responsive/adaptive and capable of handling both mobile devices and desktop computers).

As yet another example, a website or web service may purposefully provide multiple links to resources that can depend on user interactions to determine which of the multiple links to use to access the resources. For instance, an online marketplace may include separate interfaces for searching for items of interest based on keyword search terms and for browsing a category hierarchy to locate items of interest. The online marketplace may also enable users to switch from searching to browsing and vice versa but stay within the original user interface framework. Being able to distinguish between users initiating interactions via the search interface or the browse interface (e.g., differentiate user contexts) can help the online marketplace learn how to improve its search engine and/or to optimize its category hierarchy, distribute suitable amounts of resources (e.g., personnel and computing resources) between the frameworks, and experiment with different feature sets, among other benefits.

A conventional approach for supporting the situations discussed above may rely on HTTP redirects to reroute users interacting with clients that have not updated their network addresses to new network addresses. Redirects, however, can increase network latency relative to navigation via hyperlinks. In addition, redirects may have a negative impact on search engine rankings because of the preference of URL links over redirects in calculating a resource's interconnectedness.

Another conventional technique for handling network address changes can involve updating, building, and re-deploying clients that link to a resource whose network address has been altered. This can require massive coordination among different development and operations teams for hundreds of clients in some cases. Further, the effort required to re-integrate the clients can take away from improving features or building new features.

Systems and methods in accordance with various embodiments of the present disclosure may overcome these and other deficiencies with prior art approaches for designating network addresses for resources. For example, a network can implement a network address management system for improving the addressing of resources of the network by ensuring that clients (e.g., consumer applications), that link to a server application or service (e.g., a provider application), utilize consistent network addresses to the server application or service and remain resilient to changes to the network addresses. In some embodiments, the network can provide a network address manager for defining a network address schema establishing how the consumer applications may access the provider application and the information the consumer applications may need to provide for access (e.g., a network address context). The schema may include a context scope comprising tokens that constitute parts of a network address (e.g., network protocol, subdomains, domains, domain extensions subdirectories, provider application name, parameters of the provider application, etc.) and metadata tokens for describing the context in which the consumer applications link to the provider application.

The context scope can also identify the intent of a consumer application and define the scope of the tokens (e.g., required, optional, assigned, derived, etc.) for generating the network address to the provider application. Intents can include the high-level functions of a network and the subsets of the high-level functions. For example, an online marketplace can include functionality such as viewing an Item, browsing an item inventory/product catalog, or searching an item inventory/product catalog, and each of these intents/provider applications may include application namespaces that represent a particular flavor of the high-level functions. For instance, the search provider application/associated intent may include a generic/default namespace, search, and more specific types of search, such as a "searching for similar items" application namespace and a "searching for a seller's other items" application namespace.

Each intent can map to one or more application namespaces. An application namespace may comprise a set of network address patterns, each of which can set forth a kind of template or formatting for a network address, such as "$protocol://www.example.com/$providerAppName/$param1." The application namespace can also include rules for augmenting a given context. Each rule may comprise a condition, a Boolean expression, and an action for augmenting the given context if the condition is true. In addition, the rules can be associated with certain stages or phases of network address building, such as selection (e.g., at a time for selecting a particular namespace); pre-execution (e.g., at a time before applying the execution rules; execution rules (e.g., at a time for mapping the context to a specific network address pattern); and post-execution rules (e.g., at a time before generating the network address).

The network address manager may transmit the schema to a configuration management system that can validate the schema (e.g., check for syntax errors, that each token is registered to the global token registry, that default values match their data types, etc.) and write the schema to a data store. Consumer application developers that want to link to a provider application may utilize the network address manager to communicate with the configuration management system to retrieve network address schema information from the data store. In some embodiments, consumer applications may import, include, use, copy, load, open, reference, or otherwise incorporate a library for generating network addresses given the respective contexts of each consumer application. During runtime, the consumer applications may invoke one or more functions of the library for the library to build the network address to the provider application.

Using such an approach, developers of the provider application can control how consumer applications may access the provider application and the information consumer applications may need to provide for access. Some potential benefits include greater consistency for network addresses, which can improve search engine processes (e.g., more efficient crawling, smaller search engine indices, less network bandwidth utilization, faster indexing, faster search query processing, and faster presentation of search results due to fewer, shorter URLs; more accurate computations for the linkage or interconnectedness of resources; net decrease in processing, memory, storage, and network utilization; etc.) and provide better user experiences (e.g., more relevant search results due to more accurate calculations for linkage, more intelligible search results because of shorter, descriptive URLs, quicker response from search engines; etc.).

Further, by abstracting away details from consumer applications for building a network address to a provider application, the consumer applications can be more resilient to changes to the network address. When the network address changes, only the network address builder library and/or the configuration management system may be updated and that update can immediately take effect without having to edit code, re-compile edited code, and/or re-deploy the consumer applications. Modifications to the network address (e.g., updating subdomains, subdirectories, names of provider applications, provider application parameters, etc.) may not require coordinated changes across all the consumer applications. Testing and troubleshooting can also be simplified because of the elimination of potential sources of error, more concise logging, and the ability to immediately revert to previous network addresses or redirect to operational network addresses. These and various other advantages are discussed in further detail below.

Turning now to the drawings, FIG. 1A shows an example of a data flow diagram, data flow diagram 100, illustrating how network address metadata may flow through a network. For any method, process, or flow discussed herein, there can be additional, fewer, or alternative elements performed or stages that occur in similar or alternative orders, or in parallel, within the scope of various embodiments unless otherwise stated.

Data flow diagram 100 includes provider application developer 102, network address manager 106, configuration management system 110, configuration management system database 114, and consumer application runtime environments 116. Provider application developer 102 can comprise one or more users (e.g., persons or software agents) that have designed or built a provider application that consumer applications may link to via a network address (e.g., network protocol, IP address or zero or more subdomains, domain name, extension, zero or more subdirectories, provider application name, and provider application command/query parameters or command/query string). Provider application developer 102 can utilize network address manager 106 to define a schema (e.g., format, parameters, and other metadata) for a provider application's network address by transmitting network address schema information 104 to network address manager 106.

Network address schema information 104 can be associated with an intent. Intents can operate as a layer of abstraction that shields provider application-specific details from consumer application. Some examples of intents for an online marketplace include View Item (e.g., an interface for viewing a specific item of a product catalog), View Product (e.g., an interface for viewing a type of item of the product catalog), Browse (e.g., an interface for viewing a category or subcategory of the product catalog), Search (e.g., an interface for viewing items or products of the product catalog that are relevant to one or more keyword search terms), Search Similar Items (e.g., a user interface for viewing items or products of the product catalog having a correlation with an item or product, Search Seller's Other Items (e.g., a user interface for viewing items or products of the product catalog sold by a specific seller), or Events/Deals (e.g., a user interface for viewing a category/subcategory/set of items/set of products associated with a specific occasion, such as a sale, holiday, the Superbowl, etc.).

Intents can map to one or more application namespaces (e.g., flavors or sub-intents of the provider application, such as Search Similar Items or Search Seller's Other Items being specific types of the Search intent). Network address schema information 104 can include a set of the mapped namespaces and a default namespace.

Network address schema information 104 can also include a context scope for each namespace. The context scope can identify various tokens that make up the network address, such as a network protocol token, an application domain token, a provider application name token, provider application parameter tokens, etc.). Examples of network protocols include HTTP, HTTP Secure (HTTPS), or a custom protocol for native applications. The application domain can include zero or more subdomains, the domain name, and domain name extension for the provider application. In some embodiments, the application domain name may represent a client device-type domain (e.g., mobile.example.com for mobile devices and www.example.com for other computing devices), an operating system or platform-specific domain (e.g., Microsoft Windows®, Google Android®, Apple Mac OS X® or iOS®, UNIX®, LINUX®, etc.), an application or browser-specific domain (e.g., Microsoft Internet Explorer®, Google Chrome®, Apple Safari®, etc.), or other mode of differentiation among clients.

In some embodiments, each token may be globally unique and registered to a global token registry that can identify the name of the token, its data type, a description of what the token represents, a default value for the token, and a token type (e.g., URL token, metadata token, etc.). Table 1A provides a snippet of an example of a global token registry in Javascript Object Notation (JSON) format, and Table 1B provides the same snippet in tabular format.

TABLE 1A

Example JSON for a global token registry

```
[{
  "tokenName": "intentNS",
  "dataType": "String",
  "description": "Intent namespace",
  "defaultValue": ""
},
{
  "tokenName": "categoryId",
  "dataType": "Long",
  "description": "Category id",
  "defaultValue": "0"
},
{
  "tokenName": "id",
  "dataType": "Long",
  "description": "Placeholder for any type id",
  "defaultValue": "0"
},
{
  "tokenName": "title",
  "dataType": "String",
  "description": "URL encoded title",
  "defaultValue": ""
},
{
  "tokenName": "consumerAppName",
  "dataType": "String",
  "description": "Consumer application identifier/name",
  "defaultValue": ""
},
{
  "tokenName": "destinationAppNS",
  "dataType": "String",
  "description": "Destination application namespace",
  "defaultValue": ""
},
{
  "tokenName": "secondaryIntentNS",
  "dataType": "String",
  "description": "Secondary intent namespace",
  "defaultValue": ""
},
{
  "tokenName": "siteId",
  "dataType": "Integer",
  "description": "Site id",
  "defaultValue": "0"
},
{
  "tokenName": "protocol",
  "dataType": "String",
  "description": "Protocol to be used for the URL",
  "defaultValue": "http"
},
{
  "tokenName": "appDomain",
  "dataType": "String",
  "description": "Domain of the application",
  "defaultValue": ""
},
{
  "tokenName": "providerAppName",
  "dataType": "String",
  "description": "Value that uniquely identifies the Operations token of the application",
  "defaultValue": ""
},
{
  "tokenName": "searchQuery",
  "dataType": "String",
  "description": "Search query",
  "defaultValue": ""
},
{
```

TABLE 1A-continued

Example JSON for a global token registry

```
  "tokenName": "hubName",
  "dataType": "String",
  "description": "Hub name",
  "defaultValue": ""
},
{
  "tokenName": "aspects",
  "dataType": "Map",
  "description": "Map of aspect N:V pairs",
  "defaultValue": ""
},
{
  "tokenName": "certifiedIntentVersion",
  "dataType": "String",
  "description": "The certified version of the intent",
  "defaultValue": ""
},
{
  "tokenName": "cmdParams",
  "dataType": "Map",
  "description": "Map of N:V pairs that will be added as command/query string",
  "defaultValue": ""
}]
```

TABLE 1B

Example tabular view of a global token registry

| Token Name | Data Type | Description | Default Value |
|---|---|---|---|
| intentNS | String | Intent namespace | |
| categoryId | Long | Category id | 0 |
| id | Long | Placeholder for any type id | 0 |
| title | String | URL encoded title | |
| consumerAppName | String | Consumer application identifier/name | |
| destinationAppNS | String | Destination application namespace | |
| secondaryIntentNS | String | Destination application namespace | |
| siteId | Integer | Site id | 0 |
| protocol | String | Protocol to be used for the URL | http |
| appDomain | String | Domain of the application | |
| providerAppName | String | Provider application name/identifier | |
| searchQuery | String | Search query | |
| hubName | String | Hub name | |
| aspects | Map | Map of aspect N:V pairs | |
| certifiedIntentVersion | String | The certified version of the intent | |
| trackingInfo | String | Tracking information | |
| cmdParams | Map | Map of N:V pairs that will be added as command/query string | |

Tokens can also include metadata parameters that support generation of the network address by identifying the context in which the provider application is invoked (e.g., intent namespace, consumer application name, destination application namespace, secondary intent namespace, schema version, etc.). The context scope can also define the scope of each token (e.g., required, optional, derived from information sources outside of a context, or assigned based on the intent). Table 2A provides an example of a snippet of a context scope in JSON format, and Table 2B provides the same snippet in tabular format.

TABLE 2A

Example JSON of a context scope

```
...
"contextScope": [{
    "token": "intentNS",
    "scope": "required",
    "description": "Intent namespace"
},
{
    "token": "consumerAppName",
    "scope": "required",
    "description": "Consumer application identifier/name"
},
{
    "token": "id",
    "scope": "required",
    "description": "Meant for item Id",
},
{
    "token": "title",
    "scope": "required",
    "description": "Meant for item title"
},
{
    "token": "cmdParams",
    "scope": "optional",
    "description": " Map of N:V pairs that will be added as command/query string"
},
{
    "token": "destinationAppNS",
    "scope": "optional",
    "description": "Destination application namespace"
},
{
    "token": "secondaryIntentNS",
    "scope": "optional",
    "description": "Secondary intent namespace"
},
{
    "token": "protocol",
    "scope": "derived",
    "description": "Protocol to be used for the URL"
},
{
    "token": "appDomain",
    "scope": "derived",
    "description": "Domain of the application"
},
{
    "token": "providerAppName",
    "scope": "assigned",
    "description": "Provider application name/identifier"
}]
...
```

TABLE 2B

Example tabular view of a context scope

| Token | Scope | Description |
|---|---|---|
| intentNS | required | Intent namespace |
| consumerAppName | required | Consumer application identifier/name |
| id | required | Meant for item Id |
| title | required | Meant for item title |
| cmdParams | optional | Map of N:V pairs that will be added as command/query string |
| destinationAppNS | optional | Destination application namespace |
| secondaryIntentNS | optional | Secondary intent namespace |
| protocol | derived | Network protocol |
| appDomain | derived | Domain of the application |
| providerAppName | assigned | Provider application name/identifier |

As discussed, each context scope maps to an application namespace. An application namespace can identify the specific patterns and rules for building a network address. A network address pattern can set forth the format of the network address. Table 3 provides an example of a network address pattern in JSON format.

TABLE 3

Example JSON of a network address pattern

```
{
...
"appNameSpace": [{
    "name": "VI"
    "patterns": [{
    "patternName": "defaultVI",
    "pattern":
    "@{protocol}://@{appDomain}/@{providerAppName}/@{title}/@{id}",
    "default": "true",
    "relatedPatternNames": [ ]
}]
```

Rules comprise logic to apply for augmenting the context. Each rule can include a condition and an action. The condition may be a boolean expression and the action comprises one or more expressions for augmenting the context. Some examples of rules include:

Selection rules, which can identify whether the consumer application can help generate the network address for the given context. For example, a selection rule may validate the context to ensure that the context includes the required parameters for a particular application namespace;

Pre-execution rules, which can augment the context before application of the execution and post-execution rules. For example, a pre-execution rule may specify the providerAppName token for the provider application;

Execution rules, which can map the context to a specific network address pattern. For example, an execution rule can map the context to a default network address pattern or a network address pattern for a specific application namespace; and Post-execution rules, which can augment the context before the generation of the network address. For example, a post-execution rule may specify the values of the key-value pairs of the 'cmdParams' token.

In some embodiments, an exception may be thrown if, after application of the post-execution rule(s), there is insufficient information from the context to generate the network address for a specified network address pattern. In some embodiments, rules may be encoded using MVEL (MV-FLEX Expression Language). Table 4 provides an example of a set of rules for an intent (e.g., the "View Item" intent) in JSON format.

TABLE 4

Example JSON of rules of an application namespace

```
...
"rules": {
    "selection": [{
        "name": "selection-rule",
        "priority": 1,
        "condition": "id != null && title != null",
        "action": [
        "ctx.put('selectedAppNS', 'VI')",
        "ctx.put('selectionCriteriaMet', 'true')"
    ]}],
    "preExecution": [{
```

TABLE 4-continued

Example JSON of rules of an application namespace

```
    "name": "providerAppName-rule",
    "priority": 1,
    "condition": "'true'",
    "action": [
      "ctx.put('providerAppName', 'itm')"
    ]}],
    "execution": [{
      "name": "default-pattern-rule",
      "priority": 1,
      "condition": "'VI' equals selectedAppNS",
      "action": [
        "ctx.put('patternName', 'defaultVI')"
      ]}],
    "postExecution": [{
      "name": "cmdParms-rule",
      "priority": 1,
      "condition": "'true'",
      "action": [
        "ctx.put('cmdStringTokens','cmdParams')"
      ]}]
  }
  . . .
```

Putting it altogether, FIG. 2 shows an example of a network address schema, network address schema 200, and how its elements may be interrelated. For any system, model, library, manager, application, or component thereof discussed herein, there can be additional, fewer, or alternative elements arranged in similar or alternative configurations, within the scope of the various embodiments unless otherwise stated. In this example, network address schema 200 defines various parameters for building a network address for provider application 202, View Item. View Item provider application 202 includes one flavor or type, VI application namespace 212, and thus both mapped application namespaces 204 and default application namespace 206 point to VI application namespace 212. In other embodiments in which a network address schema maps to multiple application namespaces, mapped application namespaces 204 can comprise a list of those application namespaces and default application namespace can identify one of those application namespaces.

A network address schema can include multiple context scopes, with each context scope associated with one or more application namespaces. In this example, network address schema 200 includes context scope 208 and application namespace 210. Context scope 208 comprises tokens 212 with each token including name/identifier 222, scope 224, and description 226. In some embodiments, each token may also be associated with a data type (e.g., string, long, integer, etc.), a description for the token, a default value, and/or a token type, among other attributes.

A network address schema can include multiple application namespaces, and each namespace may comprise multiple network address patterns and multiple sets of rules. In this example, network address schema 200 includes VI application namespace 212, which is composed of network address pattern 216 and rules 218 and 220. Network address pattern 216 includes name/identifier 228, network address pattern 230, flag 232 indicating whether the pattern is the default pattern, and related pattern names 234.

In some embodiments, the rules of an application namespace may be categorized as selection rules, pre-execution rules, execution rules, and post-execution rules. Each rule may include name/identifier 236, order of execution or a priority value 238, one or more conditional expressions 240, and one or more actions 242. In this example, the set of selection rules of VI application namespace 212 include one selection rule, selection rule 218, that validates the context to ensure that the context includes an item identifier and an item title, and selects VI application namespace 212 and toggles a flag indicating that the selection criteria have been met. The set of selection rules also include one post-execution rule, cmdParams rule 220, that automatically populates the command string parameters token after application of the execution rules and before the network address is built.

Table 5 provides an example of a snippet of the network address schema for provider application 202 in JSON format. Table 6 provides another example of a snippet of a network address schema for a Browse provider application/intent made up of two sub-intents or application namespaces, Browse by Category (RPP) and Browse Third Party Stores by Category (SSRP).

TABLE 5

Example JSON for a network address schema for a View Item intent

```
{
  "name": "ViewItem",
  "mappedNameSpace": [
    "VI"
  ],
  "defaultAppNameSpace": "VI",
  "contextScope": [
    {
      "token": "intentNS",
      "scope": "required"
    },
    {
      "token": "consumerAppName",
      "scope": "required"
    },
    {
      "token": "id",
      "description": "Meant for item Id",
      "scope": "required"
    },
    {
      "token": "title",
      "description": "Meant for item title",
      "scope": "required"
    },
    {
      "token": "trackingInfo",
      "scope": "optional"
    },
    {
      "token": "cmdParams",
      "scope": "optional"
    },
    {
      "token": "destinationAppNS",
      "scope": "optional"
    },
    {
      "token": "secondaryIntentNS",
      "scope": "optional"
    },
    {
      "token": "certifiedIntentVersion",
      "scope": "optional"
    },
    {
      "token": "protocol",
      "scope": "derived"
    },
    {
      "token": "appDomain",
      "scope": "derived"
    },
    {
      "token": "providerAppName",
```

TABLE 5-continued

Example JSON for a network address schema for a View Item intent

```
        "scope": "assigned"
      },
  ],
  "appNameSpace": [
    {
      "name": "VI",
      "patterns": [
        }
          "patternName": "defaultVI",
          "pattern":
"@{protocol}://@{appDomain}/@{providerAppName}/@{title}/@{id}",
          "default": "true",
          "relatedPatternNames": [ ]
        }
      ],
      "rules": {
        "selection": [
          {
            "name": "selection-rule",
            "priority": 1,
            "condition": "id != null && title != null",
            "action": [
              "ctx.put('selectedAppNS', 'VI')",
              "ctx.put('selectionCriteriaMet', 'true')"
            ]
          }
        ],
        "preExecution": [
          {
            "name": "opsToken-rule",
            "priority": 1,
            "condition": "'true'",
            "action": [
              "ctx.put('providerAppName','itm')"
            ]
          }
        ],
        "execution": [
          {
            "name": "default-pattern-rule",
            "priority": 1,
            "condition": "'VI' equals selectedAppNS",
            "action": [
              "ctx.put('patternName', 'defaultVI')"
            ]
          }
        ],
        "postExecution": [
          {
            "name": "cmdParms-rule",
            "priority": 1,
            "condition": "'true'",
            "action": [
              "ctx.put('cmdStringTokens','cmdParams')"
            ]
          }
        ]
      }
    }
  ]
}
```

TABLE 6

Example JSON for a network address schema for a Browse intent

```
{
  "name": "Browse",
  "mappedNameSpace": [
    "RPP",
    "SSRP"
  ],
  "defaultAppNameSpace": "SSRP",
  "contextScope": [
    {
```

TABLE 6-continued

Example JSON for a network address schema for a Browse intent

```
      "token": "intentNS",
      "scope": "required"
    },
    {
      "token": "consumerAppName",
      "scope": "required"
    },
    {
      "token": "categoryId",
      "scope": "required"
    },
    {
      "token": "title",
      "description": "Meant for category name or browse node title",
      "scope": "required"
    },
    {
      "token": "id",
      "description": "Meant for browse node id",
      "scope": "optional"
    },
    {
      "token": "aspects",
      "scope": "optional"
    },
    {
      "token": "trackingInfo",
      "scope": "optional"
    },
    {
      "token": "cmdParams",
      "scope": "optional"
    },
    {
      "token": "destinationAppNS",
      "scope": "optional"
    },
    {
      "token": "secondaryIntentNS",
      "scope": "optional"
    },
    {
      "token": "certifiedIntentVersion",
      "scope": "optional"
    },
    {
      "token": "siteId",
      "scope": "derived"
    },
    {
      "token": "protocol",
      "scope": "derived"
    },
    {
      "token": "appDomain",
      "scope": "derived"
    },
    {
      "token": "providerAppName",
      "scope": "assigned"
    },
  ],
  "appNameSpace": [
    {
      "name": "RPP",
      "patterns": [
        {
          "tokenName": "catHub",
          "pattern":
"@{protocol}://@{appDomain}/@{providerAppName}/@{hubName}",
          "default": "true",
          "relatedPatternNames": [ ]
        }
      ],
      "rules": {
        "selection": [
          {
```

TABLE 6-continued

Example JSON for a network address schema for a Browse intent

```
            "name": "selection-rule",
            "priority": 1,
            "condition": "siteId != null && categoryId != null && aspects equals null && id equals null && rppCatLookup(siteId,categoryId) != null",
            "action": [
                "ctx.put('selectionCriteriaMet','true')",
                "ctx.put('selectedAppNS','RPP')"
            ]
          }
        ],
        "preExecution": [
          {
            "name": "opsToken-rule",
            "priority": 1,
            "condition": "'true'",
            "action": [
                "ctx.put('providerAppName','rpp')"
            ]
          }
        ],
        "execution": [
          {
            "name": "cat-hub-rule",
            "priority": 1,
            "condition": "'RPP' equals selectedAppNS",
            "action": [
"ctx.put('hubName',rppCatLookup(siteId,categoryId))",
                "ctx.put('patternName','catHub')"
            ]
          }
        ],
        "postExecution": [
          {
            "name": "cmdParms-rule",
            "priority": 1,
            "condition": "'true'",
            "action": [
                "ctx.put('cmdStringTokens','cmdParams')"
            ]
          }
        ]
      }
    },
    {
      "name": "SSRP",
      "patterns": [
        {
          "patternName": "classicSSRP",
          "pattern":
"@{protocol}://@{appDomain}/@{providerAppName}/@{title}/@{categoryId}/i.html?@{convertToCmdParams(aspects)}",
          "default": "true",
          "relatedPatternNames": [
            "bnSSRP"
          ]
        },
        {
          "patternName": "bnSSRP",
          "pattern":
"@{protocol}://@{appDomain}/@{providerAppName}/@{title}/@{categoryId}/bn_@{id}/i.html",
          "relatedPatternNames": [ ]
        }
      ],
      "rules": {
        "selection": [
          {
            "name": "selection-rule",
            "priority": 1,
            "condition": "siteId != null && categoryId != null && ((aspects != null) || (id != null) || (rppCatLookup(siteId,categoryId) equals null))",
            "action": [
                "ctx.put('selectionCriteriaMet','true')",
                "ctx.put('selectedAppNS','SSRP')"
            ]
          }
```

TABLE 6-continued

Example JSON for a network address schema for a Browse intent

```
        ],
        "preExecution": [
          {
            "name": "opsToken-rule",
            "priority": 1,
            "condition": "'true'",
            "action": [
                "ctx.put('providerAppName','sch')"
            ]
          }
        ],
        "execution": [
          {
            "name": "classic-ssrp-rule",
            "priority": 1,
            "condition": "'SSRP' equals selectedAppNS && ((aspects != null) || (id equals null))",
            "action": [
                "ctx.put('patternName','classicSSRP')"
            ]
          },
          {
            "name": "bn-ssrp-rule",
            "priority": 1,
            "condition": "'SSRP' equals selectedAppNS && id != null",
            "action": [
                "ctx.put('urlPattern','bnSSRP')"
            ]
          },
          {
            "name": "all-cats-rule",
            "priority": 2,
            "condition": "'AllCats' equals secondaryIntentNS",
            "action": [
"ctx.put('urlPattern',@{protocol}://@{appDomain}/@{providerAppName}/allcategories/all-categories)"
            ]
          }
        ],
        "postExecution": [
          {
            "name": "cmdParms-rule",
            "priority": 1,
            "condition": "'true'",
            "action": [
                "ctx.put('cmdStringTokens', 'cmdParams')"
            ]
          }
        ]
      }
    }
  ]
}
```

Returning to FIG. 1A, after network address manager 106 receives network address schema information 104 from provider application developer 102, network address manager 106 can validate schema information 104, generate a network address schema, and present the schema to production application developer 102. In some embodiments, network address manager 106 can also support schema versioning. For example, production application developer 102 can utilize network address manager 106 to retrieve the latest version of a schema, edit the schema, validate the revised schema, and request to persist the validated schema. Network address manager can transmit 108 the validated schema to configuration management system 110. The version number of the schema can be incremented on write 112, and CMDB 114 can retain previous versions of the schema.

In some embodiments, configuration management system 110 may enact a certified versioning system that can require provider application developer 102 to continue providing support for a previous version of a schema (e.g., not deprecating that version) until all consumer applications have been certified against the latest version and/or no consumer application remains certified against the previous version. In some embodiments, configuration management system 110 may be implemented using the raptor-config module for Node.js developed by eBay® Inc. The raptor-config module is a library that ingests context or configuration information and loads that information onto a NoSQL document-based database, such as MongoDB®. The raptor-config module can provide clients with the context or configuration information and track those clients. When changes occur to a particular set of the context or configuration information, the raptor-config module may notify tracked clients of the changes.

In some embodiments, consumer application users (e.g., persons or software processes) (not shown) may also utilize network address manager 106 to retrieve information to understand how to construct a context in order to generate the network address of the provider application. The consumer application users can develop code that populates the parameters of the context and passes the context to functionality provided by network address builder library 118 to generate the network address, build the code (e.g., compile code to generate a binary executable application or feed code to an interpreter that may translate the code to an efficient intermediate representation of an application), and deploy the code (e.g., execute the binary, execute the code or its intermediate representation in an interpreter or virtual machine (e.g., a Java® virtual machine (JVM)), or otherwise execute computer instructions associated with the code in consumer application runtime environment 116 or other suitable computing environment.

FIG. 3A-3D show examples of graphical user interfaces for a network address manager (e.g., network address manager 106) that consumer application developers, provider application developers, and other users may utilize to author a network address schema (e.g., network address schema 200) for a provider application, retrieve information for a consumer application to construct a network address context to pass to a network address builder library (e.g., network address builder library 118) to build a network address to the provider application, and otherwise manage network address schemas for a network. In these examples, the network can include online marketplace functionality (e.g., eBay® Inc.). However, a person having ordinary skill in the art will appreciate that these graphical user interfaces are suitable for other network services or applications, such as content management systems, search engines/web portals, social or user content-sharing networks (e.g., web logs ("blogs"), photos, videos, etc.), forum/question-and-answer websites, news websites, online encyclopedias, media streaming networks (e.g., music, videos, multimedia, etc.), content aggregators, product review sites, corporate sites, personal sites, file-sharing sites, among others. In addition, these examples show the graphical user interfaces presented on web browser (e.g., web browser 514 of FIG. 5) of a client device (e.g., client devices 508 or 510 of FIG. 5 or computing system 800 of FIG. 8). The web browser may be a desktop application, Microsoft Internet Explorer®, but other embodiments may utilize other web browsers for desktop computers or mobile devices (e.g., Google Chrome®, Mozilla Firefox®, Apple Safari®, etc.) or native applications (e.g., eBay® mobile app for Google Android®, Apple iOS®, etc.) for presenting graphical user interfaces.

Figure 3A:
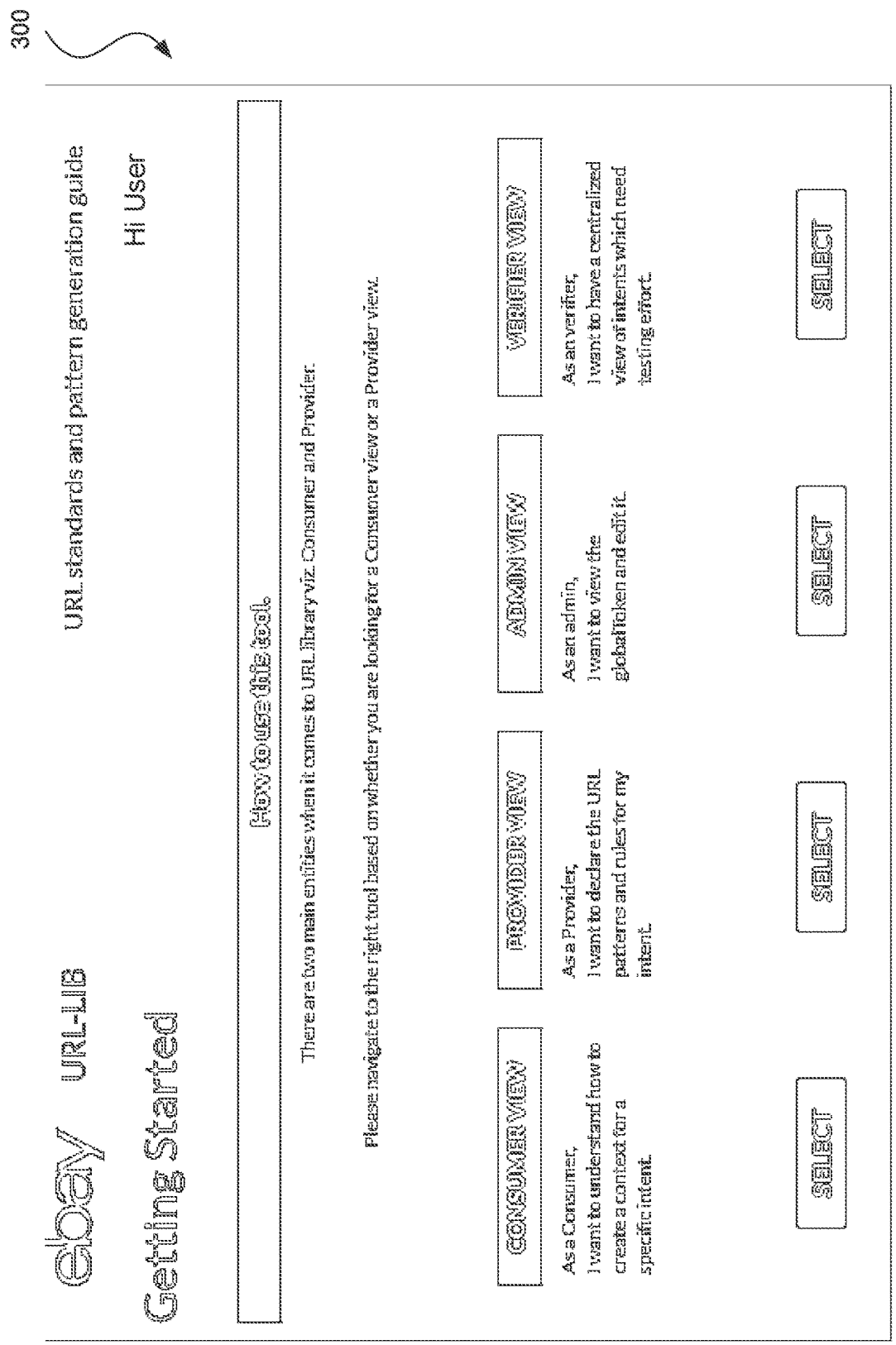
FIGS. 3A-3D illustrate examples of graphical user interfaces for a network address manager in accordance in accordance with an embodiment.

FIG. 3A illustrates an example of a landing page, landing page 300, of the network address manager. Landing page 300 can enable users to add, edit, review, or otherwise manage the network address schemas of a network. In this example, landing page 300 can operate as a portal to various user interfaces associated with different views perspectives of the network, such as consumer view 302, provider view 304, administrator view 306, and verifier view 308. Consumer view 302 can enable developers of consumer applications (e.g., consumer application 116) to understand how to create a context for a specific intent or provider application. Provider view 304 can allow developers of provider applications to define a network address schema (e.g., URL patterns and rules) for their intents. Administrator view 306 can provide network address management system users view and edit a global token registry. Verifier view 308 can facilitate testing of intents by presenting a centralized view of the intents.

Figure 3B:
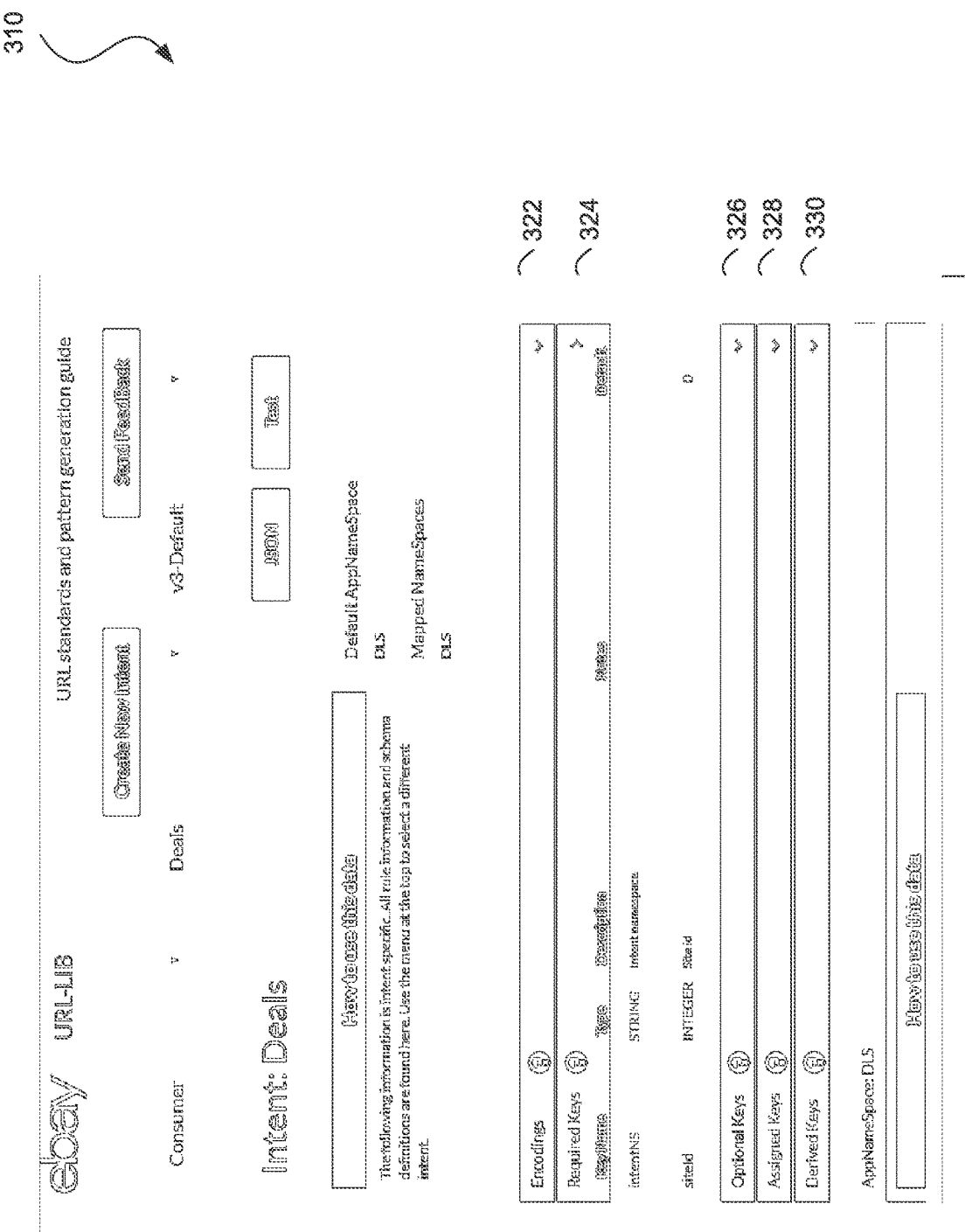

FIG. 3B shows an example of a graphical user interface for consumer view 310, which can include various user interface elements that may be helpful to consumer application developers to understand the network address schema for a specific intent or provider application. In this example, consumer view 310 may include view selection element 312 for toggling between different views of the network (e.g., consumer view, provider view, administrator view, etc.), intent selection element 314 for selecting a particular intent or provider application (e.g., View Item, View Product, Browse, Search, Deals/Events, etc.), and version selection element 316 for selecting a specific version of the network address schema for the selected intent/provider application.

Consumer view 310 can also include various user interfaces for displaying the information of a network address schema, such as user interface element 318 for presenting the entire network address schema, namespace user interface element 320 for presenting the default application namespace and the mapped namespaces of the network address schema, encodings user interface element 322 for toggling between a view of the encoding (e.g., JSON, Extensible Mark-up Language (XML), Yet Another Mark-up Language (YAML), etc.) of the network address schema and an unencoded view of the network address schema (e.g., a tabular view, a graph view, an entity relationship diagram, etc.), required tokens user interface element 324 for listing the required tokens of the network address schema, optional tokens user interface element 326 for listing the optional tokens of the network address schema, assigned tokens user interface element 328 for listing the assigned tokens of the network address schema, and derived tokens user interface element 330 for listing the derived tokens of the network address schema.

Figure 3C:
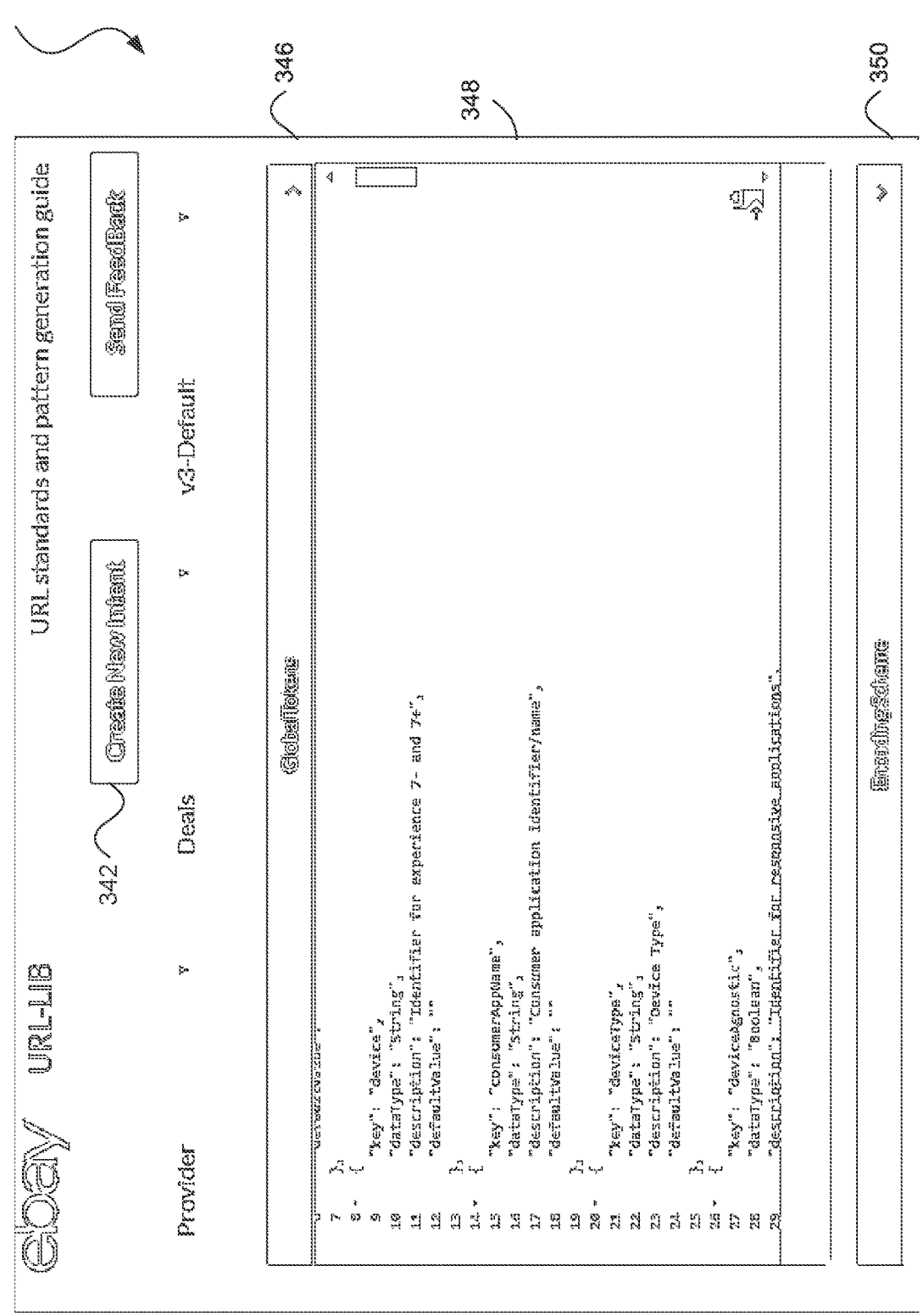
Figure 3D:
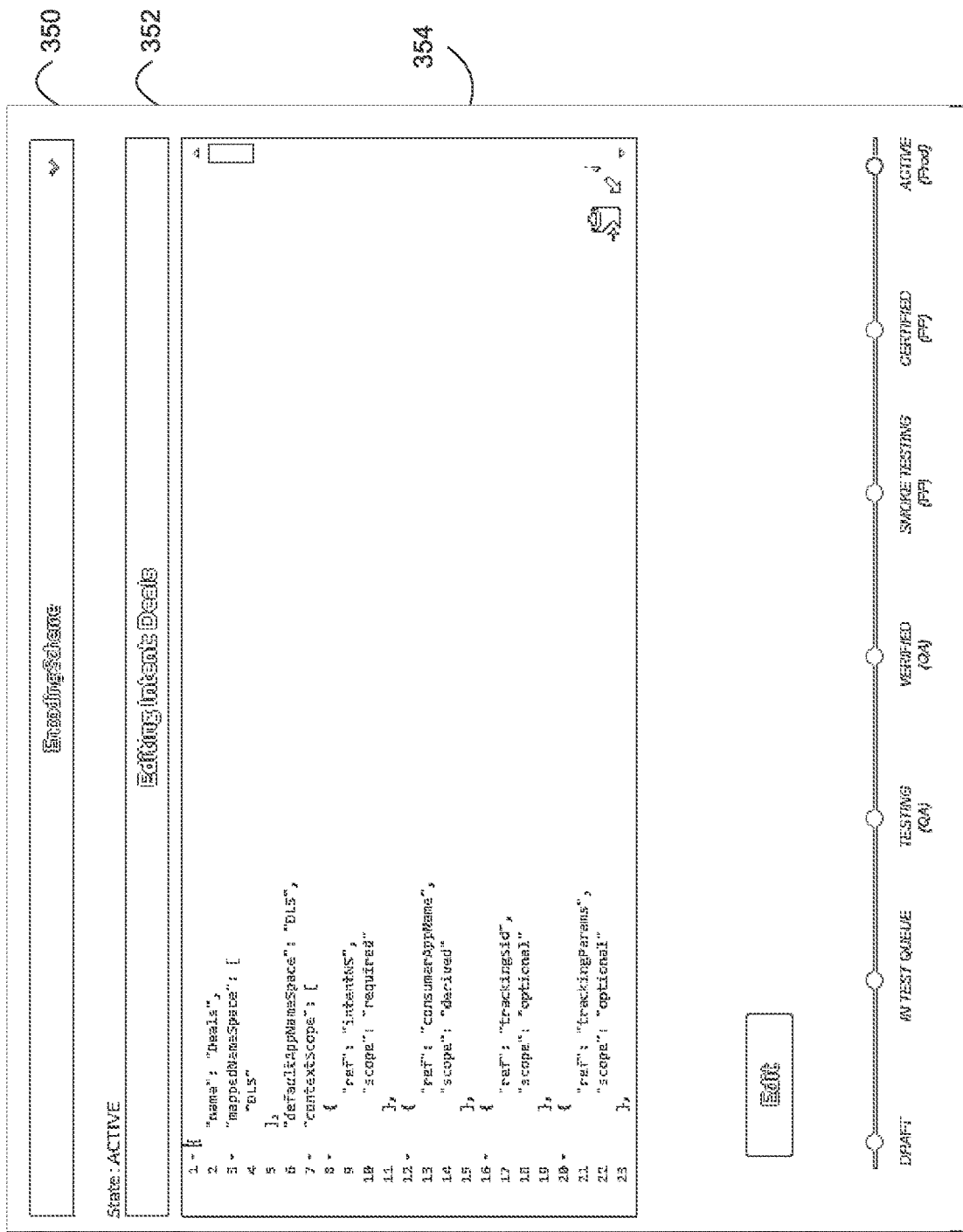

FIG. 3C and FIG. 3D illustrate an example of a graphical user interface for provider view 340, which can include various user interface elements for authoring a network address schema. In this example, provider view 340 includes user interface element 342 for creating a new intent or provider application. In some embodiments, consumer application developers may also be able to create a new version of an existing intent as a kind of wish list for the provider application developers associated with the existing intent to support in future versions.

Provider view 340 also includes view selection element 344, which can operate similarly to view selection element 312 to switch between different views of the network address schema and to indicate the current view. Provider view 340 may also include various user interfaces for viewing and editing the network address schema and related information, such as global tokens registry user interface element 346 for collapsing or expanding a global token registry, global tokens registry viewer 348 to enable a user to view the global token registry, encoding scheme user interface element 350 for collapsing or expanding an encoding scheme associated with the network address schema, intent user interface element 352 for collapsing or expanding the network address schema, intent viewer 354 for viewing the network address schema, edit user interface element 356 for editing a user interface viewer that a user is currently focused on, and timeline user interface element 358 for indicating the state of the network address schema.

Returning once again to FIG. 1A, network address builder library 118 can include metadata cache 120 (e.g., memory or cache) and rules evaluator 122 for facilitating construction of the network address. At runtime, consumer application 116 may read 134 from configuration management system 110 to populate metadata cache 120, load applicable rules into rules evaluator 122, and apply the rules to generate the network address for the provider application.

Figure 1B:
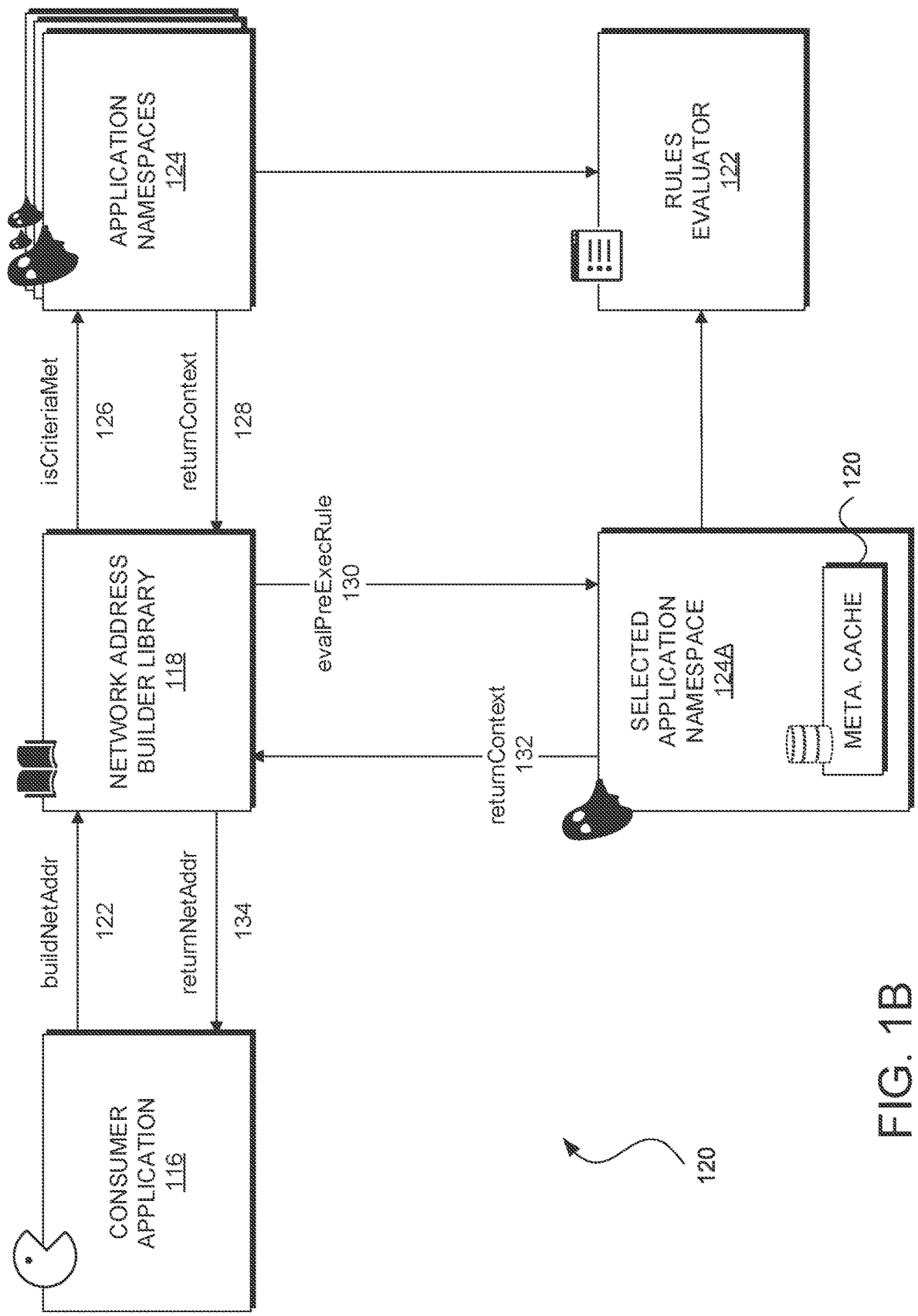
FIG. 1B illustrates an example of an application diagram for a network address builder library in accordance with an embodiment.

FIG. 1B shows an example of an application diagram, application diagram 120, illustrating the interactions between consumer application 116 and network address builder library 118 and its components. Consumer application 116 may build at least a portion of a context to identify an intent. Then, consumer application 116 may invoke a function of network address builder library 118 to build a network address (e.g., buildNetAddr 132) and pass the portion of the context to the function. Table 7 provides an example of an API for network address builder library 118.

TABLE 7

Example Java ® API for a network address builder library

```
public class URLBuilder {
    // returns the IURLResponse object based on the provided
    URL context
    public static IURLResponse buildURL(URLContext context,
boolean isDiagnosticsEnabled);
    // returns the list of IURLResponse object based on the
    provided URL contexts. This is a bulk API.
    public static List<IURLResponse>
buildURLs(List<URLContext> bulkUrlContext, boolean
isDiagnosticsEnabled);
}
public interface IURLResponse {
    // returns the built URL
    public String getURL( );
    //returns the IURLDiagnostics object
    public IURLDiagnostics getDiagnostics( );
}
```

Network address builder library 118 can retrieve, from metadata cache 120, the selection rules for application namespaces 134 associated with the intent and load them into rules evaluator 122. Network address builder library 118 may evaluate a condition of the selection rule (e.g., isCriteriaMet 136) one-by-one until identifying and validating selected application namespace 134A, whereupon the action(s) of the selection rule 152 may be performed to augment the context (e.g., returnContext 138). Subsequently, network address builder library 118 can evaluate pre-execution rule 130 associated with selected application pre-execution rule 130 associated with selected application namespace 134A and augment the context (e.g., returnContext 138). Network address builder library 118 can then execute a pre-execution rule (e.g., evalPreExecRule 140) associated with selected application namespace 134A and further augment the context, and then apply an execution rule associated with selected application namespace 134A to additionally augment the context. Thereafter, a post-execution rule may be applied for additional augmentation of the context (e.g., returnContext 132), whereupon network address builder library may generate the network address (e.g., returnNetAddr 134).

Figure 1C:
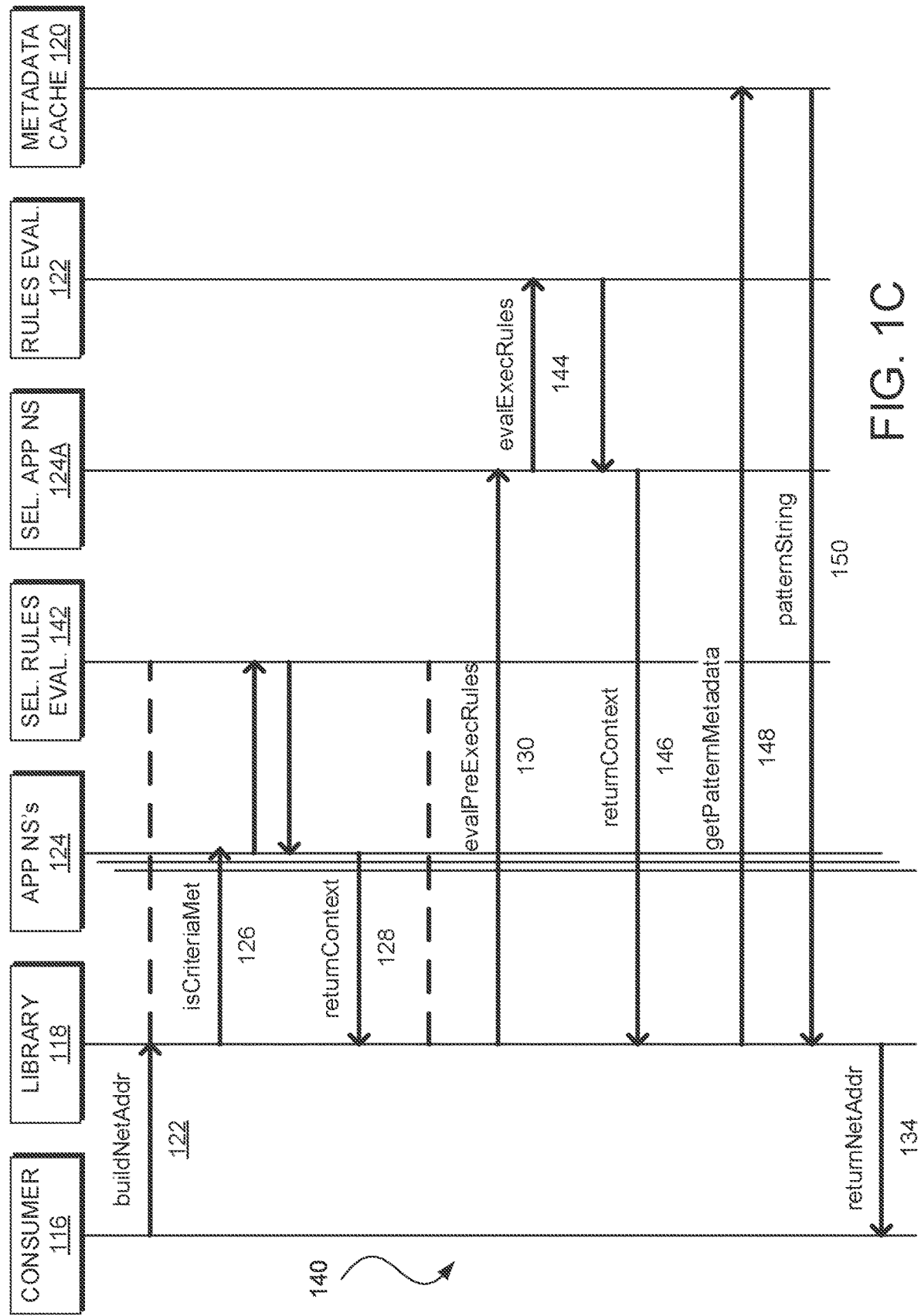
FIG. 1C illustrates an example of a sequence diagram for a network address builder library in accordance with an embodiment.

FIG. 1C shows an example of a sequence diagram, sequence diagram 150, illustrating the sequence of the interactions between consumer application 116 and network address builder library 118 and its components. As discussed, consumer application 116 may construct a portion of a context and pass the context when invoking a function (e.g., buildNetAddr 132) of network address builder library 118. Table 8A provides an example of the state of the context passed to network address builder library 118.

TABLE 8A

Example of a state of a network address context prior
to invocation of a network address builder library

| Token Name | Value |
|---|---|
| intentNS | VIEW_ITEM |
| consumerAppName | Prpweb |
| id | 252108308713 |
| title | Acme-Phone-6S-Latest-Model-64GB-Rose-Gold-Silver-Unlocked-NEW-Sealed-BOX- |

Alternatively or in addition, network address builder library can include a framework injection phase in which the library extracts common/generic information (e.g., the host/network address of consumer application 116) or information from context sources (e.g., a context management system separate from configuration management system 110; a customer experience context service; etc.) and adds the information to the context. Injection may occur at any stage of network address building (e.g., pre-invocation, selection, pre-execution, execution, post-execution, etc.). In this example, injection occurs before selection and after invocation of the function to build the network address by the consumer application. Table 8B provides an example of the state of the context after this injection phase.

TABLE 8B

Example of a state of a network address context following injection

| Token Name | Value |
|---|---|
| intentNS | VIEW_ITEM |
| consumerAppName | Prpweb |
| id | 252108308713 |
| title | Acme-Phone-6S-Latest-Model-64GB-Rose-Gold-Silver-Unlocked-NEW-Sealed-BOX- |
| protocol | http |
| appDomain | www.eMarketplace.com |
| siteId | 0 |

Network address builder library 118 may then check the condition of a selection rule (e.g., isCriteriaMet 136) to each of application namespaces 134 associated with the intent. Upon identification and validation of selected application namespace 134A, the action(s) of the selection rule may be evaluated 152 and the context augmented (e.g., returnContext 138). Table 8C provides an example of the state of the context after execution of the action(s) of the selection rule.

TABLE 8C

Example of a state of a network address context following selection

| Token Name | Value |
|---|---|
| intentNS | VIEW_ITEM |
| consumerAppName | prpweb |
| id | 252108308713 |

TABLE 8C-continued

Example of a state of a network address context following selection

| Token Name | Value |
|---|---|
| title | Acme-Phone-6S-Latest-Model-64GB-Rose-Gold-Silver-Unlocked-NEW-Sealed-BOX- |
| protocol | http |
| appDomain | www.eMarketplace.com |
| siteId | 0 |

Network address builder library 118 can evaluate pre-execution rule 140 to further augment the context after the selection phase but before the execution phase. Table 8D provides an example of the state of the context after evaluation of pre-execution rule 140.

TABLE 8D

Example of a state of a network address context following pre-execution

| Token Name | Value |
|---|---|
| intentNS | VIEW_ITEM |
| consumerAppName | prpweb |
| id | 252108308713 |
| title | Acme-Phone-6S-Latest-Model-64GB-Rose-Gold-Silver-Unlocked-NEW-Sealed-BOX- |
| protocol | http |
| appDomain | www.eMarketplace.com |
| siteId | 0 |
| selectedAppNS | VI |
| selectionCriteriaMet | true |
| app-token | itm |

An execution rule can be retrieved and evaluated 154 (e.g., using rules evaluator 122) to additionally augment the context (e.g., returnContext 156). Table 8E provides an example of the state of the context after application of the execution rule.

TABLE 8E

Example of a state of network address context following execution

| Token Name | Value |
|---|---|
| intentNS | VIEW_ITEM |
| consumerAppName | prpweb |
| id | 252108308713 |
| title | Acme-Phone-6S-Latest-Model-64GB-Rose-Gold-Silver-Unlocked-NEW-Sealed-BOX- |
| protocol | http |
| appDomain | www.eMarketplace.com |
| siteId | 0 |
| selectedAppNS | VI |

Network address builder library 118 may execute a post-execution rule (e.g., getPatternMetadata 158) to retrieve network address metadata (e.g., patternString 160 from metadata cache 120). Table 8F provides an example of the state of the context after the post-execution rule is applied.

TABLE 8F

Example of a state of a network address context following post-execution

| Token Name | Value |
|---|---|
| intentNS | VIEW_ITEM |
| consumerAppName | prpweb |

TABLE 8F-continued

Example of a state of a network address context following post-execution

| Token Name | Value |
|---|---|
| id | 252108308713 |
| title | Acme-Phone-6S-Latest-Model-64GB-Rose-Gold-Silver-Unlocked-NEW-Sealed-BOX- |
| protocol | http |
| appDomain | www.eMarketplace.com |
| siteId | 0 |
| selectedAppNS | VI |
| selectionCriteriaMet | true |
| app-token | itm |
| patternName | defaultVI |
| cmdStringTokens | cmdParams |

Finally, network address builder library 118 may build the network address (e.g., returnNetAddr 134) and provide it to consumer application 116. Table 8G provides an example of the network address built by network address builder library 118.

TABLE 8G

Example of a network address generated by a network address builder library www.eMarketplace.com/itm/Acme-Phone-6S-Latest-Model-64GB-Rose-Gold-Silver-Unlocked-NEW-Sealed-BOX-/252108308713

Figure 4A:
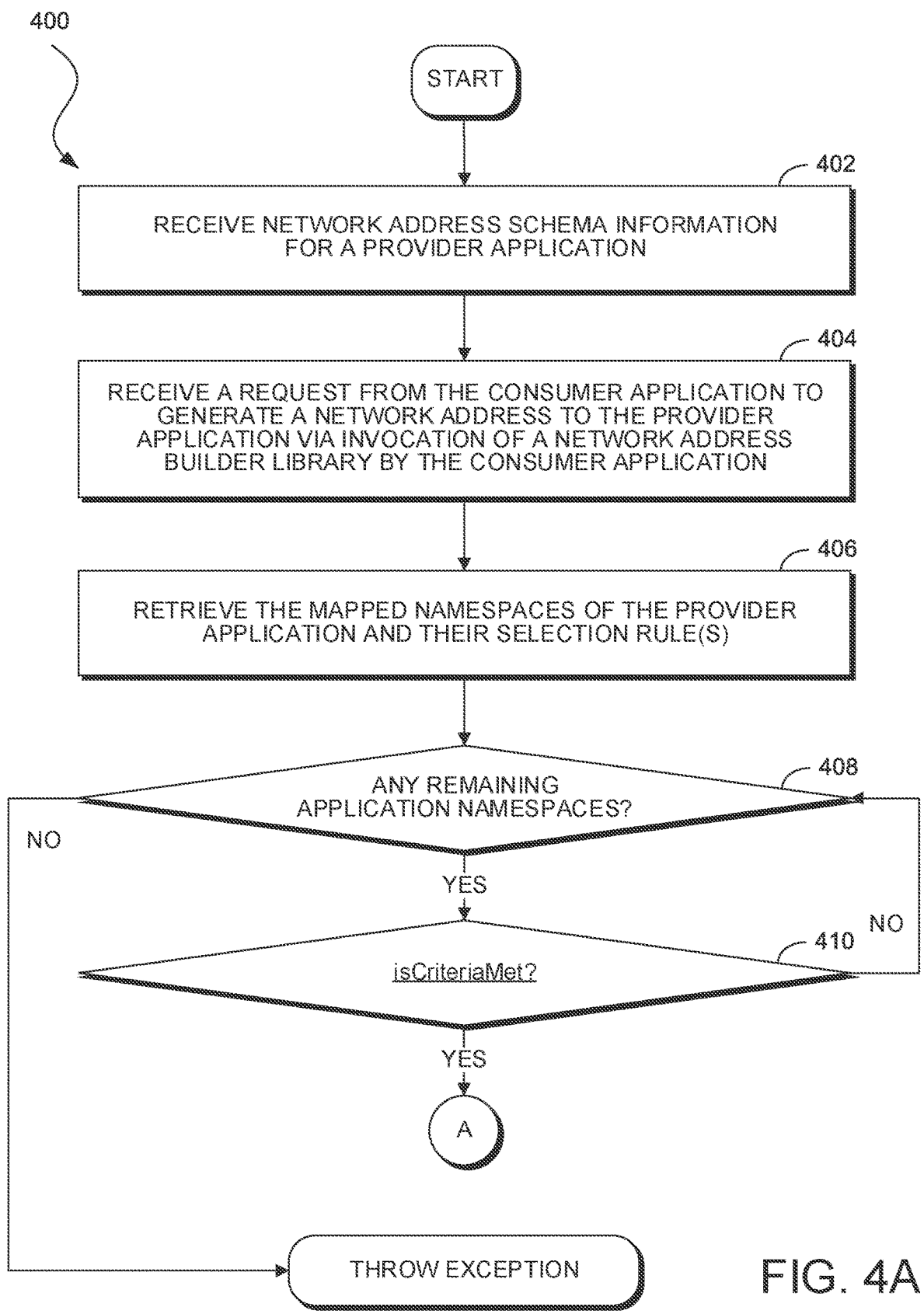
FIGS. 4A and 4B illustrate an example of a process for generating network addresses in accordance with an embodiment.
Figure 4B:
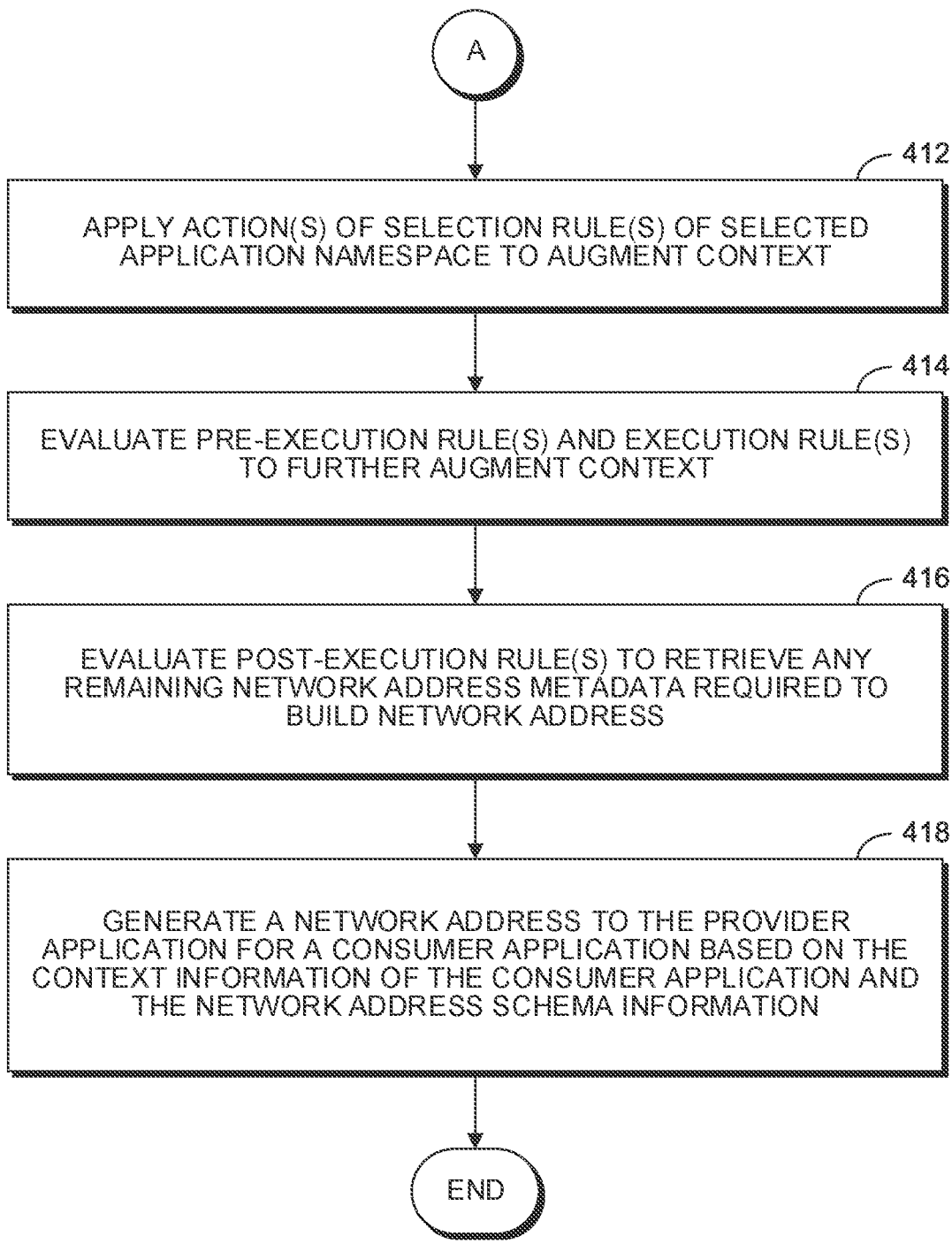

FIG. 4 shows an example of a process, process 400, for generating and maintaining consistent network addresses to computing resources and for developing applications that are resilient to changes in network addresses to those resources. For illustrative purposes, a network including a provider application and multiple consumer applications that link to a network address of the provider application can perform process 400 but one of ordinary skill in the art will appreciate that other embodiments may utilize other types of applications to perform process 400.

Process 400 may begin at step 402 in which a computing system of the network may receive network address schema information for the provider application during a runtime of a consumer application executing on the computing system. The network address schema information can include a name/identifier (e.g., a high-level intent, such as View Item, View product, Browse, Search, Search Similar Items, Search Seller's Other Items, Events/Deals, etc.), a set of mapped namespaces for the provider application (e.g., flavors or specific types of the provider application, such as Search Similar Items and Search Seller's Other Items being specific types of a Search provider application), a default namespace, and a context scope. The context scope can identify various tokens that make up the network address, such as a network protocol (e.g., HTTP, HTTPS, etc.), an application domain (e.g., www.example.com, mobile.example.com, etc.), sub-domains (if not included in the application domain), domain extensions (if not included in the application domain), subdirectories, provider application name, or provider application command/query parameters or command/query string. The context scope can also identify various tokens representing metadata parameters for building a network address context, a consumer application name, a destination application namespace, or a secondary intent namespace, among other metadata. In addition, the content scope can identify an intent (e.g., a particular provider application to which a consumer application wishes to link) and the scope of each token (e.g., required, optional, assigned, derived, etc.).

Each intent can map to one or more application namespaces. An application namespace can include a set of network address patterns (e.g., "$protocol://www.example.com/$providerApp/$param1/$param2") and rules to apply at certain phases of network address building (e.g., selection, pre-execution, execution, and post-execution).

The network can provide a network address builder library (e.g., network address builder library 118 of FIGS. 1A-1C) that the consumer application may incorporate and to invoke the functionality of to generate a network address to provider applications. The computing system can receive the network schema information from the network (e.g., pushed to the computing system data by the network or pulled by the computing system/network address builder library directly by a method call or indirectly via instantiation/invocation of the network address builder library) at the runtime of the consumer application. In some embodiments, the network address builder library may include a data store (e.g., metadata cache 120 of FIGS. 1A-1C) to persist at least some of the network address schema information. The size of the data store can be a function of the processing, memory/storage, and network bandwidth capacities of the computing system versus the size of the network schema information and the rate at which the network schema information changes. For example, when the network address schema information is relatively small and infrequently changed, the data store may contain all or substantially all of the network address schema information. On the other hand, if the network address schema information is immense and constantly in flux, the network builder library may include no data store or a very small data store and the network address schema information can be accessible as a network service.

Process 400 may proceed to step 404 in which the computing system receives a request from the consumer application to generate the network address to the provider application via the consumer application invoking the library (e.g., buildNetAddr 132 of FIGS. 1B-1C). The computing system, via the network address builder library, can identify a high-level intent/provider application (e.g., View Item, Browse, Search, etc.) to which the consumer application attempts to link. Then at step 406, the computing system/network address builder library can retrieve the mapped namespaces associated with the intent/provider application and their respective selection rule(s). If, at conditional step 408, the conditional expression(s) of the selection rule(s) is/are not applicable to any one of the mapped namespaces, the network/network address builder library may throw an exception. Otherwise, process 400 may proceed to conditional step 410 in which the computing system/network address builder library can apply the conditional expression(s) to identify a selected application namespace.

Upon identification and validation, the computing system/network address builder library may execute the action(s) of the selection rule(s) (e.g., evaluate selection rule 152) to augment the context (e.g., returnContext 138) at step 412. In some embodiments, the network address builder library may include a rules engine (e.g., rules evaluator 122 of FIGS. 1A-1C) for applying rules associated with the selected application namespace at various stages of network address building. In other embodiments, the rules engine may external to the computing system and may be accessible as a network service, such as if the computing system lacks the processing, memory, and/or storage capacity to execute the rules engine and/or network bandwidth is abundant. In still other embodiments, a combination of these approaches may be utilized and may depend on optimizing/balancing available computing resources.

At step 414, the computing system/network address builder library may evaluate the pre-execution rule(s) (e.g., evalPreExecRules 140) and execution rule(s) (e.g., evalExecRules 154) associated with the selected application namespace to further augment the context (e.g., returnContext 156). Following the execution stage but prior to building the network address, the computing system/network address builder library can apply the post-execution rule(s) associated with the selected application namespace (e.g., getPatternMetadata 158) to retrieve any remaining network address metadata (e.g., patternString) needed to construct the network address at step 416. Finally, at step 418, the computing system/network address builder library can generate the network address.

In some embodiments, the network may include a network address manager for provider application developers to define a network address schema for their applications. The network address manager can be a user application (e.g., a native client application, such as native client application 516 of FIG. 5 or a web application, such as the network address manager illustrated in the graphical user interfaces of FIGS. 3A-3D and provided by web server 520 of FIG. 5) or a machine-to-machine application or API (e.g., Restful State Transfer (REST), Simple Object Access Protocol (SOAP), Service Oriented Architecture (SOA), microservices, etc., and provided by third party server 506 or provided by API server 518). In other embodiments, there may be no presentation layer and the network can receive the network schema information directly to a configuration management system (e.g., configuration management system 110 of FIG. 1A).

In some embodiments, consumer application developers may also utilize the network address manager (or an underlying configuration management system, such as configuration management system 110 of FIG. 1A) to select a particular namespace and its associated context scope to determine how to construct the context and the consumer applications can explicitly construct the context. In other embodiments, context information can be derived by a computing system/network address builder library based on the identity of a consumer application executing on the computing system, a network address of the computing system, or other sources for context (e.g., a configuration/context management system, a customer experience context service, etc.). In still other embodiments, a combination of these approaches may be utilized and may depend on the degree to which a provider application developer wishes to abstract away the details of the provider application from consumer applications. For example, a network address schema can shield all of the details of a provider application via injection of context information and derivation of context information from sources other than the consumer application. Another network address schema may require the consumer application to build the context in its entirety. Yet another network address schema may like somewhere in between the first and the second network address schemas.

Figure 5:
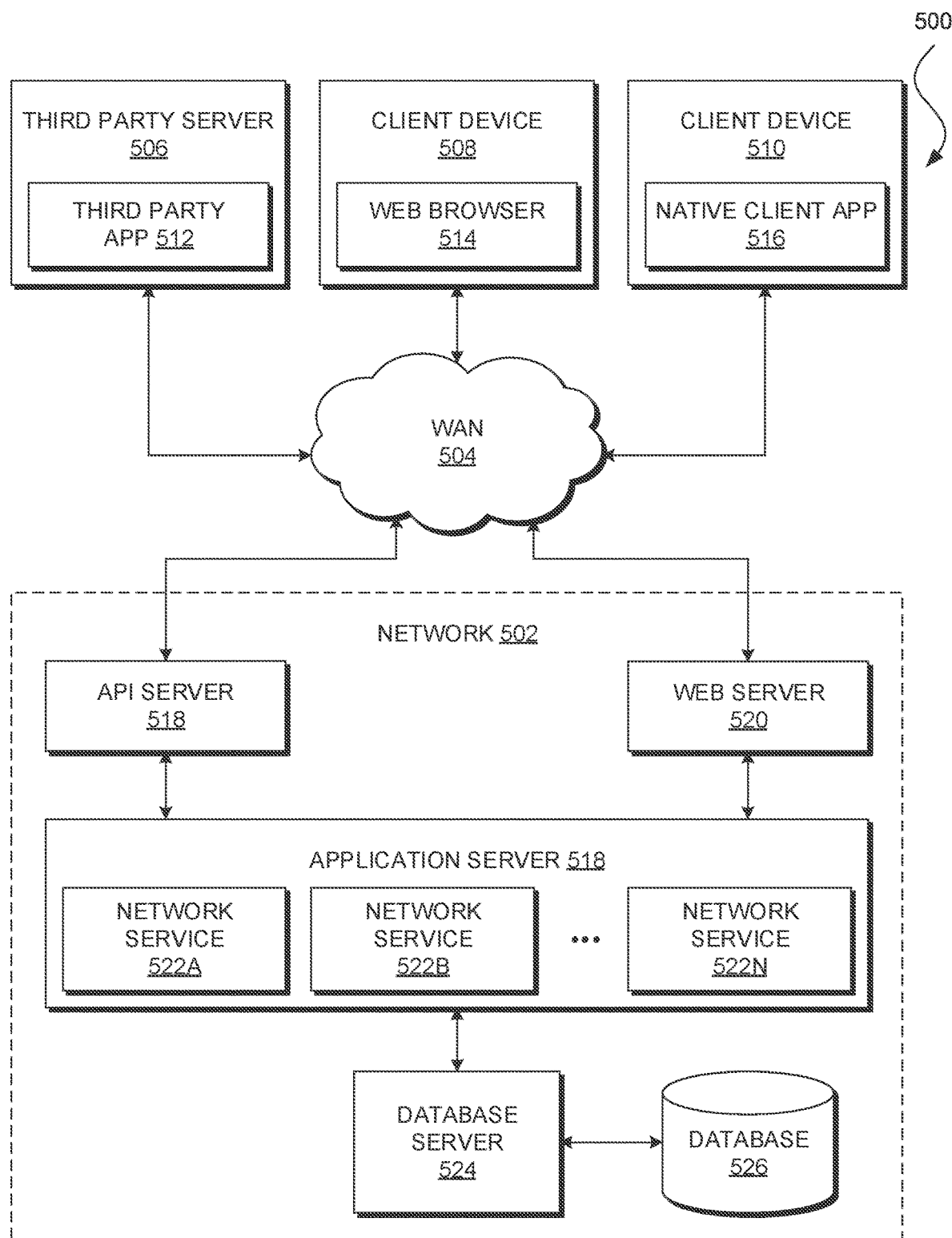
FIG. 5 illustrates an example of a network environment in accordance with an embodiment.

FIG. 5 shows an example of an application architecture, application architecture 500, in which various embodiments of the present disclosure may be deployed. In this example, application architecture 500 includes network 502, wide area network (WAN) 504 (e.g., the Internet), third party server 506, client device 508, and client device 510. Network 502 can provide online marketplace functionality to third party server 506, client device 508, and client device 510 over WAN 504. Users (e.g., buyers, sellers, advertisers, etc.) may interact with network 502 using third party application 512 (e.g., applications incorporating the eBay® API), web browser 514 (e.g., Microsoft Internet Explorer®, Google Chrome®, Mozilla Firefox®, Apple Safari®, etc.), or native application 516 (e.g., eBay® mobile app for Google Android®, Apple iOS®, etc.) executing on third party server 506, client device 508, and client device 510, respectively. Although each of third party server 506, client device 508, and client device 510 are shown executing one application to interact with network 502, each may include third party application 512, web browser 514, native application 516, or some combination of these applications.

Some examples of client devices 508 and 510 include servers, desktop computers, mobile phones, smart phones, tablets, ultra-books, netbooks, laptops, multi-processor systems, microprocessor-based or programmable consumer electronics, game consoles, set-top boxes, or any other communication device that a user may utilize to access network 502. An example of an implementation of client device 508 and/or 510 is discussed further below with respect to FIG. 8.

Application program interface (API) server 518 and web server 520 may be coupled to, and provide programmatic and web interfaces respectively to, application server 518. Application server 518 may host network services 522A, 522B, . . . , 522N (collectively, 522), each of which may comprise one or more modules or applications embodied as hardware, software, firmware, or any combination thereof. Application server 518 may connect to database server 524 to access information storage repository or database 526. In some embodiments, database 526 is a storage device that stores information to be posted (e.g., publications or listings, images of products, etc.) to network services 522. Database 526 may also store digital goods information in accordance with various embodiments.

Web browser 514 can access various network services 522 via a web interface supported by web server 520. Similarly, native client application 516 can access the various services and functions provided by network 502 via the programmatic interface provided by API server 518. In some embodiments, native client application 516 may be a seller application (e.g., the Turbo Lister desktop application developed by eBay® Inc.) to enable sellers to author and manage listings within network 502 in an off-line manner, and to perform batch-mode communications between native client application 516 and network 502.

Additionally, third-party application 512, executing on a third-party server 506, may have programmatic access to network 502 via the programmatic interface provided by API server 518. For example, third-party application 512, utilizing information retrieved from network 502, may support one or more features or functions on a website hosted by the third-party. The third-party website may provide one or more promotional, marketplace, or payment functions that are supported by the relevant applications of the network 502.

Figure 6:
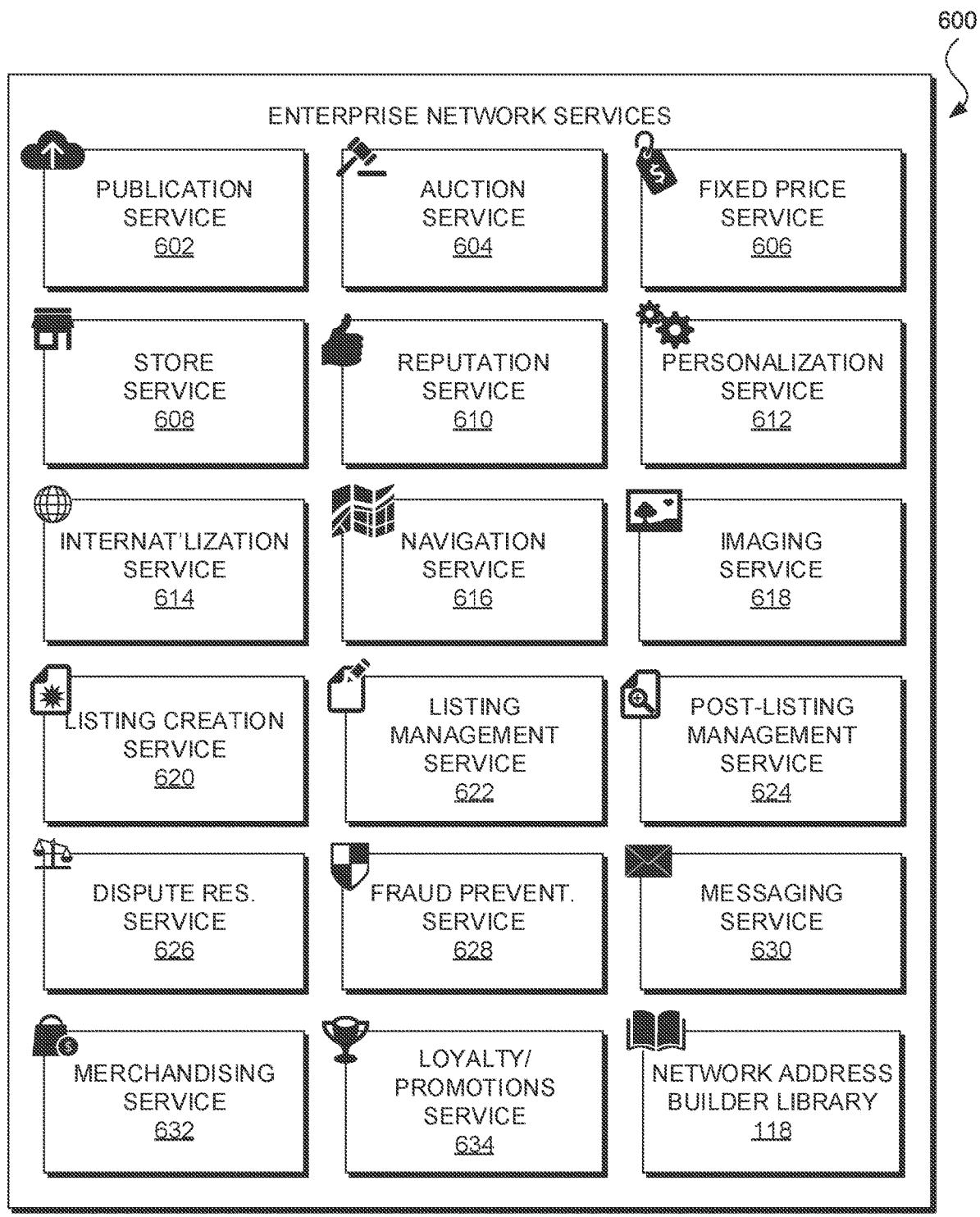
FIG. 6 illustrates services of a network including functionality to generate and maintain consistent network addresses to computing resources in accordance with an embodiment.

FIG. 6 shows an example of a collection of network services 600 that a network (e.g., network 502 of FIG. 5) can deploy in an embodiment of the present disclosure. For illustrative purposes, network services 600, in this example, provide certain functionality for users of an online marketplace, such as enabling sellers to add or edit item listings and associated content (e.g., text descriptions of the item listings, photos associated with the item listings, videos associated with the item listings, etc.), allowing buyers to review the item listings (e.g., examine detailed descriptions of item listings, search item listings by keyword or image query, receive recommended item listings, etc.), facilitating the sales or exchange of the item listings (e.g., auctions, fixed price sales, returns, etc.), and the like. Network services 600 may be physically located on-premises (e.g., hosted within one or more data centers owned or leased by an enterprise), off-premises (e.g., hosted by a public cloud provider, data center provider, etc.), or both (e.g., hosted using a hybrid cloud environment). Thus, network services 600 can run in dedicated or shared servers that are communicatively coupled to enable communications between the servers. Network services 600 themselves can be communicatively coupled (e.g., via appropriate interfaces) to each other and to various data sources to allow information to be passed between the services or allow the services to share and access common data.

In this example, network services 600 include publication service 602, auction service 604, fixed-price service 606, store service 608, reputation service 610, personalization service 612, internationalization service 614, navigation service 616, imaging 618, listing creation service 620, listing management service 622, post-listing management service 624, dispute resolution service 626, fraud prevention service 628, messaging service 630, merchandising service 632, loyalty/promotions service 634, and network address builder library 118. One of ordinary skill in the art will appreciate that other embodiments may utilize different sets of services, including configurations with more services, fewer services, or alternative services, for providing online marketplace functionality.

Publication service 602 can publish information, such as item listings or production description pages. Auction service 604 can support auction-format listing and other variable price-setting mechanisms (e.g., English, Dutch, Vickrey, Chinese, Double, Reverse auctions etc.). In some embodiments, auction service 604 may also provide a number of features in support of auction-format listings, such as a reserve price feature in which a seller may specify a minimum price that must be exceeded in order for a winning bidder to receive an item in connection with a listing or a proxy-bidding feature in which a buyer may specify a maximum price not to be exceeded by an agent bidding on the buyer's behalf.

Fixed-price service 606 can support fixed-price listing formats (e.g., traditional classified advertisement-type listing or a catalogue listing) and buyout-type listings (e.g., the Buy-It-Now (BIN) technology developed by eBay® Inc.). In some embodiments, buyout-type listings may be offered in conjunction with auction-format listings, and allow a buyer to purchase items (e.g., goods or services), that may also be offered for sale via an auction, for a fixed-price that is typically higher than the starting price of the auction.

Store service 608 can allow a seller to group listings within a "virtual" store, which can include items branded and otherwise personalized by and for the seller. In some embodiments, store service 608 may also provide functionality for sellers to offer promotions, incentives, and features that are specific and customized for the seller.

Reputation service 610 can allow users to establish, build, and maintain reputations in an online marketplace. In some embodiments, reputation service 610 can publish users' reputations to potential trading partners. For example, an online marketplace may support person-to-person trading but users may have no history or other reference information to determine the trustworthiness and credibility of potential trading partners. Reputation service 610 can allow a user to establish a reputation within the online marketplace over time, such as through feedback provided by other transaction partners. Other potential trading partners may then reference such a reputation for the purposes of assessing credibility and trustworthiness.

Personalization service 612 can allow users to customize various aspects of their interactions with an online marketplace. For example, a user may create a personalized reference page on which information regarding transactions to which the user is (or has been) a party may be viewed. Further, personalization service 612 may enable users to customize listings and other aspects of their interactions with the online marketplace and other parties.

In some embodiments, an online marketplace may be organized according to language (e.g., English, Spanish, Mandarin, etc.), geographic region (e.g., Europe, United Kingdom, Scotland, etc.), demographic group (e.g., French Canadians, Basques, Cantonese-speaking Chinese, etc.), or other categorization. For example, one version of the online marketplace may be customized for the United Kingdom, while another version of the online marketplace may be customized for the United States. Each of these versions may operate as an independent marketplace or may be customized (or internationalized) presentations of a common underlying marketplace. Accordingly, the online marketplace may include internationalization service 614 for providing customized information (and/or the presentation of information) by the online marketplace according to predetermined criteria (e.g., lingual, geographic, demographic, or similar criteria).

Navigation of an online marketplace may be facilitated by navigation service 616. In some embodiments, navigation service 616 can include a search service to enable keyword searches of listings published in the online marketplace. In some embodiments, navigation service 616 can also support image searches by receiving an image of an item (e.g., a query image) and providing item listings of items similar to the query. In some embodiments, navigation service 616 can include a browse service that allows users to browse various category, catalogue, or inventory data structures according to which listings may be classified within the online marketplace. Various other navigation services may also be provided to supplement the search and browsing services.

In order to make listings of an online marketplace as visually informative and attractive as possible, network services 600 may include imaging service 618 to enable users to upload images with listings. In some embodiments, imaging service 618 can also search for images related to a listing and incorporate the related images within the listings. In some embodiments, imaging service 618 may also support one or more promotional features, such as image galleries that are presented to potential buyers. For example, sellers may pay an additional fee to have an image included within a gallery of images for promoted items.

Listing creation service 620 can allow sellers to conveniently author listings pertaining to items (e.g., goods or services) that they wish to transact via an online marketplace. Listing management service 622 can allow sellers to manage such listings. For example, a seller may author and/or publish a large number of listings within the online marketplace. The management of such listings may present the user a challenge. Listing management service 622 can provide a number of features (e.g., auto-relisting, inventory level monitors, etc.) to assist the seller in managing such listings. Post-listing management service 624 can also assist sellers with a number of activities that typically occur after expiration of listings. For example, upon completion of an auction facilitated by auction service 604, a seller may wish to leave feedback regarding a particular buyer. Post-listing management service 624 may provide an interface to reputation service 610 to allow the seller to provide feedback regarding multiple buyers.

Dispute resolution service 626 can provide mechanisms in which disputes arising between transacting parties may be resolved. For example, dispute resolution service 626 may provide guided procedures to direct the parties through a number of steps in an attempt to settle a dispute. In the event that the dispute cannot be settled via the guided procedures, the dispute may be escalated to a third-party mediator or arbitrator.

Fraud prevention service 628 can implement fraud detection and prevention mechanisms to reduce the occurrence of fraud within an online marketplace.

Messaging service 630 can be responsible for the generation and delivery of messages to users of an online marketplace. For example, messaging service 630 can transmit messages regarding the status of listings within the online marketplace (e.g., "outbid" notices to bidders, notifications indicating that a bidder has won an auction, reminders to sellers to ship items, reminders to buyers to pay for items, etc.). Messaging service 630 may utilize any message delivery networks and platforms to deliver messages to users. For example, messaging service 630 may deliver electronic mail (e-mail), instant messages (IMs), Short Message Service (SMS) text messages, facsimiles, or voice messages (e.g., Voice over IP (VoIP)) over various telecommunication networks, such as the Internet, Plain Old Telephone Service (POTS) networks, cellular networks, WIFI networks, etc.).

Merchandising service 632 can support various merchandising functions that are made available to sellers to increase sales in an online marketplace. Merchandising service 632 can also operate the various merchandising features that may be invoked by sellers, and may monitor and track the success of merchandising strategies employed by sellers.

An online marketplace, or one or more parties entering into transactions in the online marketplace, may operate loyalty programs supported by loyalty/promotions service 634. For example, a buyer may earn loyalty or promotion points for each transaction established and/or concluded with a particular seller, and be offered a reward for which accumulated loyalty points can be redeemed.

Network address builder library 118 can provide the same or similar functionality discussed above with respect to FIGS. 1A-1C and 4. That is, a consumer application can incorporate network address builder library 118 and invoke a function of the library when the consumer application needs to link to a provider application. For example, the landing page of an online marketplace may include links to change the settings of a personal account of a user, to manage listings of items the user sells within the online marketplace, and manage expired listings and listings of items that the user has already sold. This landing page application can function as a consumer application, incorporate network address builder library 118, and invoke the library to build network addresses to personalization service 612, listing management service 622, and post-listing management service 624, which function as provider applications in this instance.

Figure 7:
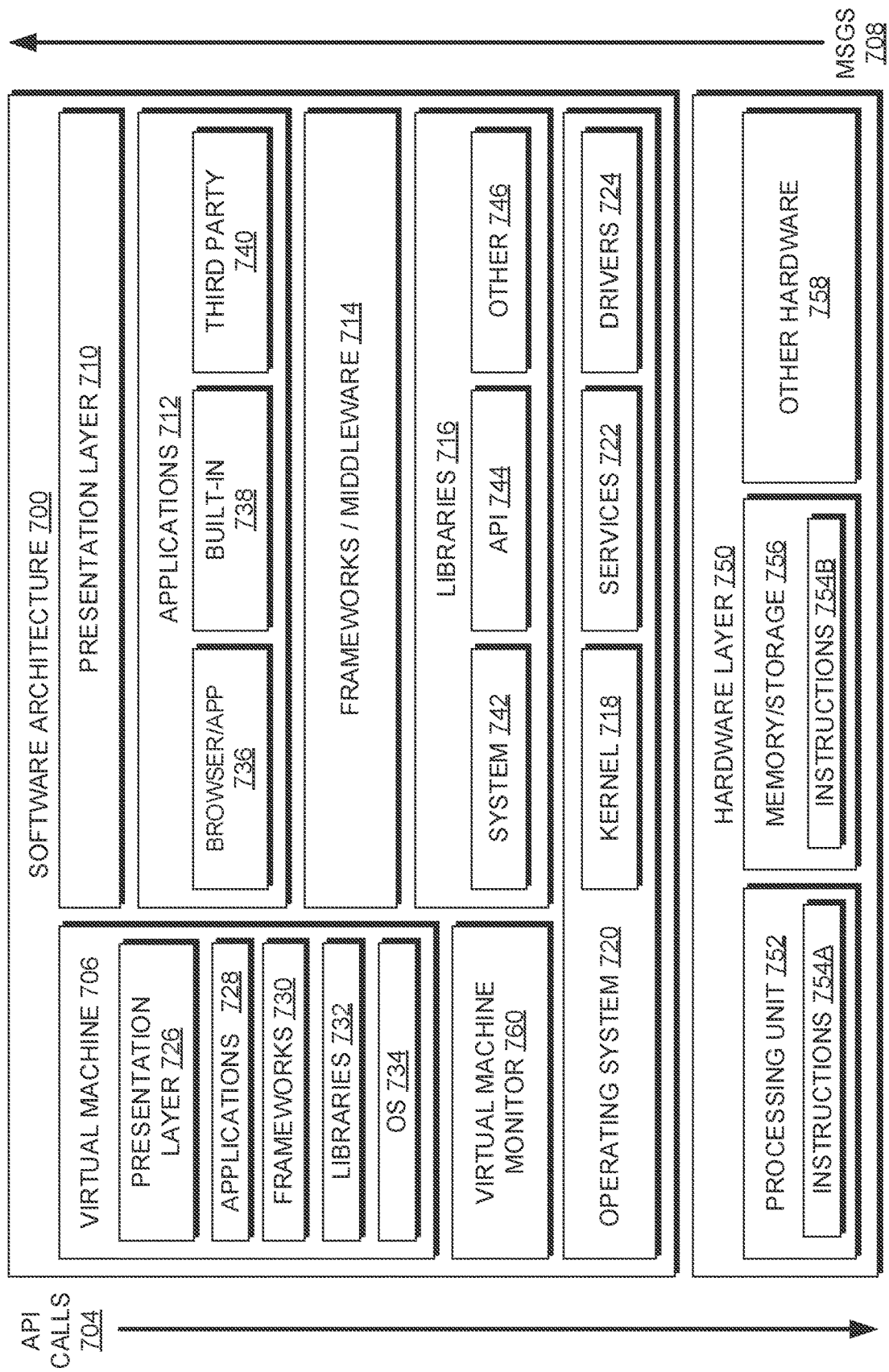
FIG. 7 illustrates an example of a software architecture in accordance with an embodiment.

FIG. 7 shows an example of software architecture 700 that various hardware devices described in the present disclosure can implement. Software architecture 700 is merely one example of a software architecture for implementing various embodiments of the present disclosure and other embodiments may utilize other software architectures to provide the functionality described herein. Software architecture 700 may execute on hardware, such as computing system 800 of FIG. 8. Hardware layer 750 can represent a computing system, such as computing system 800 of FIG. 8. Hardware layer 750 can include one or more processing units 752 having associated executable instructions 754A. Executable instructions 754A can represent the executable instructions of software architecture 700, including implementation of the methods, processes, flows, systems, models, libraries, managers, applications, or components thereof set forth in FIGS. 1A-1C, 2, 3A-3D, 4A-4B, 5, and 6. Hardware layer 750 can also include memory and/or storage modules 756, which also have executable instructions 754B. Hardware layer 750 may also include other hardware 758, which can represent any other hardware, such as the other hardware illustrated as part of computing system 800.

In the example of FIG. 7, software architecture 700 may be conceptualized as a stack of layers in which each layer provides particular functionality. For example, software architecture 700 may include layers such as operating system 720, libraries 716, frameworks/middleware 714, applications 712, and presentation layer 710. Operationally, applications 712 and/or other components within the layers may invoke API calls 704 through the software stack and receive a response, returned values, and so forth as messages 708. The layers illustrated are representative in nature and not all software architectures have all layers. For example, some mobile or special-purpose operating systems may not provide a frameworks/middleware layer 714, while others may provide such a layer. Other software architectures may include additional or different layers.

Operating system 720 may manage hardware resources and provide common services. In this example, operating system 720 includes kernel 718, services 722, and drivers 724. Kernel 718 may operate as an abstraction layer between the hardware and the other software layers. For example, kernel 718 may be responsible for memory management, processor management (e.g., scheduling), component management, networking, security settings, and so on. Services 722 may provide other common services for the other software layers. Drivers 724 may be responsible for controlling or interfacing with the underlying hardware. For instance, drivers 724 may include display drivers, camera drivers, Bluetooth drivers, flash memory drivers, serial communication drivers (e.g., Universal Serial Bus (USB) drivers), Wi-Fi drivers, audio drivers, power management drivers, and so forth depending on the hardware configuration.

Libraries 716 may provide a common infrastructure that may be utilized by applications 712 and/or other components and/or layers. Libraries 716 typically provide functionality that allows other software modules to perform tasks in an easier fashion than to interface directly with the underlying operating system functionality (e.g., kernel 718, services 722, and/or drivers 724). Libraries 716 may include system libraries 742 (e.g., C standard library) that may provide functions such as memory allocation functions, string manipulation functions, mathematic functions, and the like. In addition, libraries 716 may include API libraries 744 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphics for display), database libraries (e.g., SQLite that may provide various relational database functions), web libraries (e.g., WebKit that may provide web browsing functionality), and the like. Libraries 716 may also include a wide variety of other libraries 746 to provide many other APIs to applications 712 and other software components/modules.

Frameworks 714 (sometimes also referred to as middleware) may provide a higher-level common infrastructure that may be utilized by applications 712 and/or other software components/modules. For example, frameworks 714 may provide various graphic user interface (GUI) functions, high-level resource management, high-level location services, and so forth. Frameworks 714 may provide a broad spectrum of other APIs that may be utilized by applications 712 and/or other software components/modules, some of which may be specific to a particular operating system or platform.

Applications 712 can include web browser or native client application 736, built-in application 738, and/or third-party application 740. Some examples of built-in application 738 include a contacts application, a browser application, a book reader application, a location application, a media application, a messaging application, and/or a game application. Third-party application 740 may include any application developed by an entity other than the vendor of the host operating system or platform, such as desktop software running on Microsoft Windows®, UNIX®, LINUX®, Apple Mac OS X®, or other suitable desktop operating system; or mobile software running on a mobile operating system such as Apple iOS®, Google Android®, Microsoft Windows Phone®, or other mobile operating system. In this example, third-party application 740 may invoke API calls 704 provided by operating system 720 to facilitate functionality described herein.

Applications 712 may utilize built-in operating system functions (e.g., kernel 718, services 722, and/or drivers 724), libraries (e.g., system libraries 742, API libraries 744, and other libraries 746), or frameworks/middleware 714 to create user interfaces to interact with users of the system. Alternatively, or in addition, interactions with a user may occur through presentation layer 710. In these systems, the application/module "logic" can be separated from the aspects of the application/module that interact with a user.

Some software architectures utilize virtual machines. In the example of FIG. 7, this is illustrated by virtual machine 706. A virtual machine creates a software environment where applications/modules can execute as if they were executing on a physical computing device (e.g., computing system 800 of FIG. 8). Virtual machine 706 can be hosted by a host operating system (e.g., operating system 720). The host operating system typically has a virtual machine monitor 760, which can manage the operation of virtual machine 706 and the interface with the host operating system (e.g., operating system 720). A software architecture executes within virtual machine 706, and may include operating system 734, libraries 732, frameworks/middleware 730, applications 728, and/or presentation layer 726. These layers executing within virtual machine 706 can operate similarly or differently to corresponding layers previously described.

Figure 8:
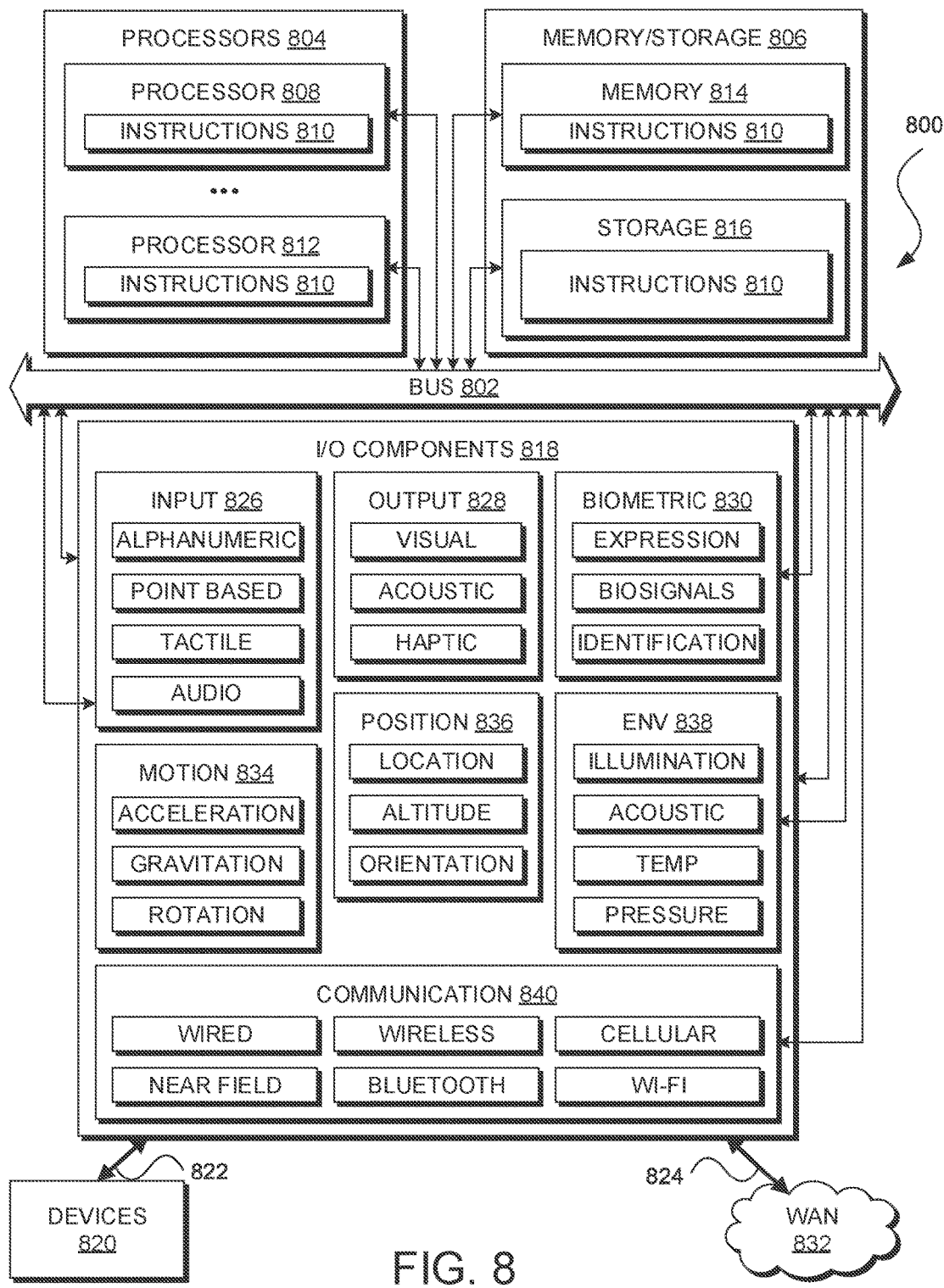
FIG. 8 illustrates an example of a computing device in accordance with an embodiment.

FIG. 8 shows an example of a computing system, computing system 800, in which various embodiments of the present disclosure may be implemented. In this example, computing system 800 can read instructions 810 from a computer-readable medium (e.g., a computer-readable storage medium) and perform any one or more of the methodologies discussed herein. Instructions 810 may include software, a program, an application, an applet, an app, or other executable code for causing computing system 800 to perform any one or more of the methodologies discussed herein. For example, instructions 810 may cause computing system 800 to execute process 400 of FIGS. 4A and 4B. Alternatively or in addition, instructions 810 may implement the methods, processes, flows, systems, models, libraries, managers, applications, or components thereof set forth in FIGS. 1A-1C, 2, and 3A-3D; client applications 512, 514, and 516 or services 520 of FIG. 5; services 600 of FIG. 6, software architecture 700 of FIG. 7, and so forth. Instructions 810 can transform a general, non-programmed computer, such as computing system 800 into a particular computer programmed to carry out the functions described herein.

In some embodiments, computing system 800 can operate as a standalone device or may be coupled (e.g., networked) to other devices. In a networked deployment, computing system 800 may operate in the capacity of a server or a client device in a server-client network environment, or as a peer device in a peer-to-peer (or distributed) network environment. Computing system 800 may include a server, a workstation, a desktop computer, a laptop computer, a tablet computer, a netbook, a set-top box (STB), a personal digital assistant (PDA), an entertainment media system, a cellular telephone, a smart phone, a mobile device, a wearable device (e.g., a smart watch), a smart home device, other smart devices, a web appliance, a network router, a network switch, a network bridge, or any electronic device capable of executing instructions 810, sequentially or otherwise, that specify actions to be taken by computing system 800. Further, while a single device is illustrated in this example, the term "device" shall also be taken to include a collection of devices that individually or jointly execute instructions 810 to perform any one or more of the methodologies discussed herein.

Computing system 800 may include processors 804, memory/storage 806, and I/O components 818, which may be configured to communicate with each other such as via bus 802. In some embodiments, processors 804 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio frequency integrated circuit (RFIC), another processor, or any suitable combination thereof) may include processor 808 and processor 812 for executing some or all of instructions 810. The term "processor" is intended to include a multi-core processor that may comprise two or more independent processors (sometimes also referred to as "cores") that may execute instructions contemporaneously. Although FIG. 8 shows multiple processors 804, computing system 800 may include a single processor with a single core, a single processor with multiple cores (e.g., a multi-core processor), multiple processors with a single core, multiple processors with multiples cores, or any combination thereof.

Memory/storage 806 may include memory 814 (e.g., main memory or other memory storage) and storage 816 (e.g., a hard-disk drive (HDD) or solid-state device (SSD) may be accessible to processors 804, such as via bus 802. Storage 816 and memory 814 store instructions 810, which may embody any one or more of the methodologies or functions described herein. Instructions 810 may also reside, completely or partially, within memory 814, within storage 816, within processors 804 (e.g., within the processor's cache memory), or any suitable combination thereof, during execution thereof by computing system 800. Accordingly, memory 814, storage 816, and the memory of processors 804 are examples of computer-readable media.

As used herein, "computer-readable medium" means an object able to store instructions and data temporarily or permanently and may include random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" may include a single medium or multiple media (e.g., a centralized or distributed database, or associated caches and servers) able to store instructions 810. The term "computer-readable medium" can also include any medium, or combination of multiple media, that is capable of storing instructions (e.g., instructions 810) for execution by a computer (e.g., computing system 800), such that the instructions, when executed by one or more processors of the computer (e.g., processors 804), cause the computer to perform any one or more of the methodologies described herein. Accordingly, a "computer-readable medium" can refer to a single storage apparatus or device, "cloud-based" storage systems or storage networks that include multiple storage apparatus or devices, or a system in between these configurations. The term "computer-readable medium" excludes signals per se.

I/O components 818 may include a wide variety of components to receive input, provide output, produce output, transmit information, exchange information, capture measurements, and so on. The specific I/O components included in a particular device will depend on the type of device. For example, portable devices such as mobile phones will likely include a touchscreen or other such input mechanisms, while a headless server will likely not include a touch sensor. In some embodiments, I/O components 818 may include output components 826 and input components 828. Output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 818 may include alphanumeric input components (e.g., a keyboard, a touch screen configured to receive alphanumeric input, a photo-optical keyboard, or other alphanumeric input components), pointer-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In some embodiments, I/O components 818 may also include biometric components 830, motion components 834, position components 836, or environmental components 838, or among a wide array of other components. For example, biometric components 830 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. Motion components 834 may include acceleration sensor components (e.g., accelerometer), gravitation sensor components, rotation sensor components (e.g., gyroscope), and so forth. Position components 836 may include location sensor components (e.g., a Global Position System (GPS) receiver component), altitude sensor components (e.g., altimeters or barometers that detect air pressure from which altitude may be derived), orientation sensor components (e.g., magnetometers), and the like. Environmental components 838 may include illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

Communication may be implemented using a wide variety of technologies. I/O components 818 may include communication components 840 operable to couple computing system 800 to WAN 832 or devices 820 via coupling 824 and coupling 822 respectively. For example, communication components 840 may include a network interface component or other suitable device to interface with WAN 832. In some embodiments, communication components 840 may include wired communication components, wireless communication components, cellular communication components, Near Field Communication (NFC) components, Bluetooth components (e.g., Bluetooth Low Energy), Wi-Fi components, and other communication components to provide communication via other modalities. Devices 820 may be another computing device or any of a wide variety of peripheral devices (e.g., a peripheral device coupled via USB).

Moreover, communication components 840 may detect identifiers or include components operable to detect identifiers. For example, communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via communication components 840, such as location via Internet Protocol (IP) geolocation, location via Wi-Fi signal triangulation, location via detecting an NFC beacon signal that may indicate a particular location, and so forth.

In various embodiments, one or more portions of WAN 832 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi network, another type of network, or a combination of two or more such networks. For example, WAN 832 or a portion of WAN 832 may include a wireless or cellular network and coupling 824 may be a Code Division Multiple Access (CDMA) connection, a Global System for Mobile communications (GSM) connection, or another type of cellular or wireless coupling. In this example, coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

Instructions 810 may be transmitted or received over WAN 832 using a transmission medium via a network interface device (e.g., a network interface component included in communication components 840) and utilizing any one of several well-known transfer protocols (e.g., HTTP). Similarly, instructions 810 may be transmitted or received using a transmission medium via coupling 822 (e.g., a peer-to-peer coupling) to devices 820. The term "transmission medium" includes any intangible medium that is capable of storing, encoding, or carrying instructions 810 for execution by computing system 800, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method, comprising:
receiving, by a computing system, network address schema information for accessing an application;
receiving, by the computing system, a request to generate a network address to the application;
in response to receiving the request, determining a context in which the network address to the application is to be generated;
identifying an application namespace based on a determined context, the application namespace including a selection rule having a condition for selecting the application namespace, and the application namespace being identified by evaluating the determined context against the condition; and
generating, based at least in part on the application namespace, the network address to the application.

2. The method of claim 1, wherein the context is determined by handling context information provided by requests in connection with access to the application according to the network address schema information.

3. The method of claim 1, wherein the determined context is used to identify one or more tokens and an individual token is used as at least part of the network address.

4. The method of claim 3, wherein the individual token is related to at least one of: a network protocol, a subdomain, a domain, a domain extension subdirectory, or a name of a provider.

5. The method of claim 1, wherein the determined context is used to identify a function, from a plurality of different functions provided by the application, to which the request is directed.

6. The method of claim 5, wherein the application namespace is identified from a plurality of application namespaces associated with the function.

7. The method of claim 1, wherein the network address schema information comprises metadata tokens for describing the context of user interaction associated with access to the application.

8. The method of claim 1, wherein context information is determined based on user interaction with the application and describes a context including at least one of: viewing an item, browsing items, searching for items, searching for similar items, or searching a seller's items.

9. The method of claim 1, wherein the network address schema information defines context information that is to be determined based on user interaction with the application to describe a context of the user interaction as a user interacts with the application in connection with access to the application, including describing which interface of separate interfaces with which the user interacts.

10. The method of claim 1, wherein the network address schema information defines context information that is to be determined and provided by requests in connection with access to the application to describe a context of user interaction associated with the access.

11. A system comprising:
one or more processors; and
memory including instructions that, when executed by the one or more processors, cause the system to perform operations comprising:
receiving network address schema information for accessing an application;
receiving a request to generate a network address to the application;
in response to receiving the request, determining a context in which the network address to the application is to be generated;
identifying an application namespace based on a determined context, the application namespace including a selection rule having a condition for selecting the application namespace, and the application namespace being identified by evaluating the determined context against the condition; and
generating, based at least in part on the application namespace, the network address to the application.

12. The system of claim 11, wherein the determined context is used to identify one or more tokens, an individual token is used as at least part of the network address, and the individual token is related to at least one of: a network protocol, a subdomain, a domain, a domain extension subdirectory, or a name of a provider.

13. The system of claim 11, wherein the determined context is used to identify a function, from a plurality of different functions provided by the application, to which the request is directed.

14. The system of claim 13, wherein the application namespace is identified from a plurality of application namespaces associated with the function.

15. The system of claim 11, wherein the determined context identifies a type of client from which the request is received.

16. The system of claim 11, wherein the network address schema information defines context information that is to be provided by requests in connection with access to the application to describe a context of user interaction associated with the access.

17. A non-transitory computer-readable storage medium including instructions that, when executed by one or more processors of a computing system, cause the computing system to perform operations comprising:
receiving network address schema information for accessing an application, the network address schema information defining context information that is to be determined and provided by requests in connection with access to the application, the context information determined based on user interaction with the application to describe a context of the user interaction associated with the access;
receiving a request to generate a network address to the application, the request including the context information;
in response to receiving the request, determining a context in which the network address to the application is to be generated based on the context information;
identifying an application namespace based on a determined context, the application namespace including a selection rule having a condition for selecting the application namespace, and the application namespace being identified by evaluating the determined context against the condition; and
generating, based at least in part on the application namespace, the network address to the application.

18. The non-transitory computer-readable storage medium of claim 17, wherein the context is determined by handling the context information according to the network address schema information.

19. The non-transitory computer-readable storage medium of claim 17, wherein the determined context is used to identify one or more tokens for the network address, wherein an individual token is related to at least one of: a network protocol, a subdomain, a domain, a domain extension subdirectory, or a name of a provider.

20. The non-transitory computer-readable storage medium of claim 17, wherein the determined context is used to identify a function, from a plurality of different functions provided by the application, to which the request the application namespace being identified from a plurality of application namespaces associated with the function.

* * * * *